US012795252B2

(12) United States Patent
Zannoni et al.

(10) Patent No.: US 12,795,252 B2
(45) Date of Patent: Nov. 10, 2026

(54) SENSOR DEVICE AND METHOD FOR OPERATING A SENSOR DEVICE

(71) Applicant: Sony Semiconductor Solutions Corporation, Kanagawa (JP)

(72) Inventors: Massimo Zannoni, Stuttgart (DE); Milan Schilling, Stuttgart (DE); Eshar Ben Dor, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/839,742

(22) PCT Filed: Feb. 7, 2023

(86) PCT No.: PCT/EP2023/052901

§ 371 (c)(1),
(2) Date: Aug. 20, 2024

(87) PCT Pub. No.: WO2023/161006

PCT Pub. Date: Aug. 31, 2023

(65) Prior Publication Data

US 2025/0175716 A1 May 29, 2025

(30) Foreign Application Priority Data

Feb. 28, 2022 (EP) .................................... 22159201

(51) Int. Cl.
*H04N 25/46* (2023.01)
*H04N 25/47* (2023.01)
*H04N 25/60* (2023.01)

(52) U.S. Cl.
CPC ............. *H04N 25/46* (2023.01); *H04N 25/47* (2023.01); *H04N 25/60* (2023.01)

(58) Field of Classification Search
CPC ......... H04N 25/46; H04N 25/47; H04N 25/60
See application file for complete search history.

(56) References Cited

U.S. PATENT DOCUMENTS 9,294,693 B1 3/2016 Yi
10,498,977 B2 12/2019 Berner
(Continued)

FOREIGN PATENT DOCUMENTS

EP 3876520 A1 9/2021
WO 2020/154253 A1 7/2020
(Continued)

OTHER PUBLICATIONS

International Search Report and Written Opinion mailed on Mar. 7, 2023, received for PCT Application PCT/EP2023/052901, filed on Feb. 7, 2023, 11 pages.
(Continued)

*Primary Examiner* — Amy R Hsu
(74) *Attorney, Agent, or Firm* — XSENSUS LLP

(57) ABSTRACT

A sensor device comprises a plurality of pixels each configured to receive light and perform photoelectric conversion to generate an electrical signal, a plurality of processing units each configured to generate output signals based on the electrical signals generated by the pixels, and circuitry that connects the plurality of pixels and the plurality of processing units such that information on the electrical signal generated by at least one of the pixels is provided to at least two processing units, and such that at least one of said processing units is provided with information on electrical signals from at least two pixels.

15 Claims, 27 Drawing Sheets

(56) References Cited

U.S. PATENT DOCUMENTS

| | | | | |
|---|---|---|---|---|
| 2021/0151492 | A1 | 5/2021 | Berner et al. | |
| 2021/0185265 | A1 | 6/2021 | Wong et al. | |
| 2021/0185266 | A1* | 6/2021 | Chan | G06V 10/147 |
| 2022/0166925 | A1* | 5/2022 | Nakagawa | B60R 1/00 |
| 2022/0201204 | A1* | 6/2022 | Hirata | B60R 1/22 |
| 2023/0117006 | A1* | 4/2023 | Price | G06T 3/40<br>348/243 |

FOREIGN PATENT DOCUMENTS

| | | | |
|---|---|---|---|
| WO | 2020/195700 | A1 | 10/2020 |
| WO | 2020/241108 | A1 | 12/2020 |
| WO | 2021/021453 | A1 | 2/2021 |

OTHER PUBLICATIONS

Li et al., "A 132 by 104 10 μm-Pixel 250 μW 1kefps Dynamic Vision Sensor with Pixel-Parallel Noise and Spatial Redundancy Suppression", 2019 Symposium on VLSI Circuits Digest of Technical Papers, Jun. 2019, pp. C216-C217.

* cited by examiner

SENSOR DEVICE AND METHOD FOR OPERATING A SENSOR DEVICE

CROSS-REFERENCE TO RELATED APPLICATIONS

The present application is based on PCT filing PCT/EP2023/052901, filed Feb. 7, 2023, which claims priority from European Patent Application No. 22159201.7, filed Feb. 28, 2022, the entire contents of each are incorporated herein by reference.

FIELD OF THE INVENTION

The present technology relates to a sensor device and a method for operating a sensor device, in particular, to a sensor device and a method for operating a sensor device that allow capturing of high resolution images at low illumination conditions.

BACKGROUND

Typical image sensors connect pixels that convert incoming light to an electrical signal to processing circuitry that further processes the electrical signal to produce an output signal. Usually there is a one-to-one assignment of blocks of processing circuitry (or processing units) to the pixels. While this ensures that output signals have the same spatial resolution as the resolution provided by the pixels, problems might arise in conditions with low illuminations, since in this case the signal to noise ratio at each pixel might drop to a level that does not allow a meaningful processing of the pixel signals, e.g. for image reconstruction.

This problem is usually addressed by binning, i.e. by combining the electrical signals from several pixels before providing them to a single processing unit. Although in this manner the signal to noise ratio can be sufficiently improved, the output resolution of the processing units drops by a factor equal to the number of binned pixels. For example, if four pixel signals will be combined, the final output resolution will only amount to a quarter of the pixel resolution.

The above is of particular relevance for dynamic vision sensors, DVSs, or any other event detection sensors, EVSs, since these sensor types are particularly strongly affected by low light conditions.

Further, it is often of interest in image sensors to recognize certain geometrical features in the captured scenes, such as lines or edges. This becomes particularly difficult at low light conditions, especially if regular binning is applied, since either the features cannot be recognized due to low signal to noise ratios or since features become blurred and therefore unrecognizable due to the binning.

It is therefore desirable to improve the imaging capacities of sensor devices at low light conditions.

SUMMARY OF INVENTION

To this end, a sensor device is provided that comprises a plurality of pixels each configured to receive light and perform photoelectric conversion to generate an electrical signal, a plurality of processing units each configured to generate output signals based on the electrical signals generated by the pixels, and circuitry that connects the plurality of pixels and the plurality of processing units such that information on the electrical signal generated by at least one of the pixels is provided to at least two processing units, and such that at least one of said processing units is provided with information on electrical signals from at least two pixels.

Further, a method for operating a sensor device is provided, the method comprising: receiving light and performing photoelectric conversion with a plurality of pixels of the sensor device to generate electrical signals, providing via circuitry of the sensor device that connects the plurality of pixels with a plurality of processing units information on the electrical signal generated by at least one of the pixels to at least two processing units, providing via the circuitry at least one of said processing units with information on electrical signals from at least two pixels; and generating with each of the plurality of processing units output signals based on the electrical signals generated by the pixels.

Instead of simply binning the electrical signals of several, i.e. at least two, pixels to increase the signal to noise ratio at one processing unit, the electrical signal of several, i.e. at least two, pixels is also shared between different processing units. Thus, while spatial resolution is lost in principle by combining pixel signals to be fed to a single processing unit, this loss in resolution is (at least partly) compensated by forwarding the electrical signal of one pixel (or information on this signal) not only to one processing unit, but to several processing units. Thus, the signal to noise ratio at the processing units can be increased, while at the same time the number of processing units receiving different information from the pixels can be maintained in order to guarantee a high resolution at the output level of the processing units. This allows for per-pixel tracking of a feature moving across the array of pixels/processing units, as opposed to regular binning where resolution of a feature's motion is degraded.

DETAILED DESCRIPTION

The present disclosure is directed to mitigating problems occurring for pixel based sensor devices in low illumination conditions, in which processing of pixel signals is carried out before an output signal for each of the pixels is provided. In particular, the problem is addressed how to ensure that the signals from the pixels carry enough information to allow meaningful processing of said signals without (overly) reducing the resolution set by the number of pixels. The solutions to this problem discussed below are applicable to all according sensor types. However, in order to ease the description and also in order to cover an important application example, the present description is focused without prejudice on DVS/EVS. It has to be understood that although in the following often reference will be made to the circuitry of DVS/EVS, the offered solution to the low illumination problem can be applied in principle to all pixel based sensor devices.

First, a possible implementation of a DVS/EVS will be described. This is of course purely exemplary. It is to be understood that DVSs/EVSs could also be implemented differently.

Figure 1:
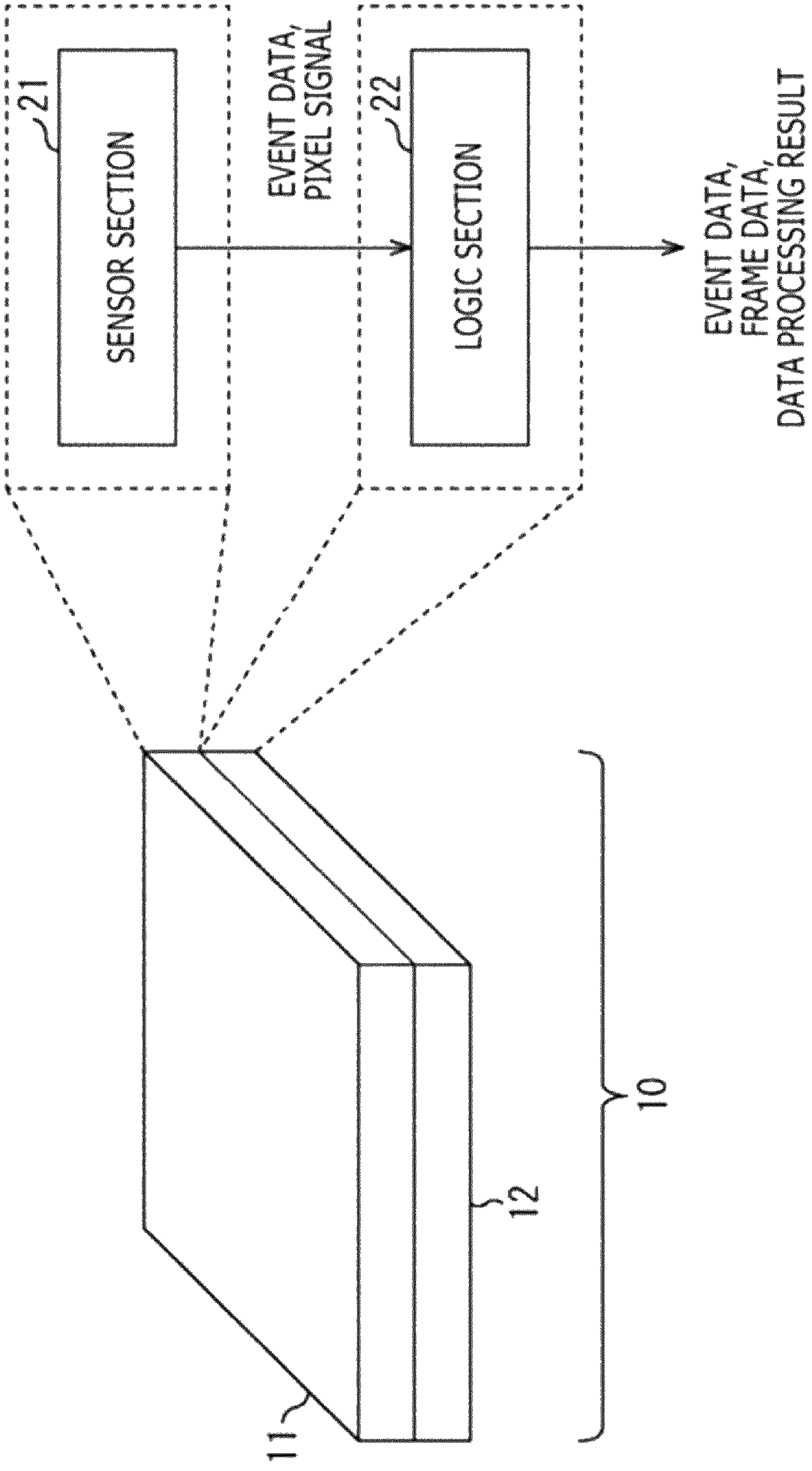
FIG. 1 is a schematic diagram of a sensor device.

FIG. 1 is a diagram illustrating a configuration example of a sensor device 10, which is in the example of FIG. 1 constituted by a sensor chip.

The sensor device 10 is a single-chip semiconductor chip and includes a sensor die (substrate) 11, which serves as a plurality of dies (substrates), and a logic die 12 that are stacked. Note that, the sensor device 10 can also include only a single die or three or more stacked dies.

In the sensor device 10 of FIG. 1, the sensor die 11 includes (a circuit serving as) a sensor section 21, and the logic die 12 includes a logic section 22. Note that, the sensor section 21 can be partly formed on the logic die 12. Further, the logic section 22 can be partly formed on the sensor die 11.

The sensor section 21 includes pixels configured to perform photoelectric conversion on incident light to generate electrical signals, and generates event data indicating the occurrence of events that are changes in the electrical signal of the pixels. The sensor section 21 supplies the event data to the logic section 22. That is, the sensor section 21 performs imaging of performing, in the pixels, photoelectric conversion on incident light to generate electrical signals, similarly to a synchronous image sensor, for example. The sensor section 21, however, generates event data indicating the occurrence of events that are changes in the electrical signal of the pixels instead of generating image data in a frame format (frame data). The sensor section 21 outputs, to the logic section 22, the event data obtained by the imaging.

Here, the synchronous image sensor is an image sensor configured to perform imaging in synchronization with a vertical synchronization signal and output frame data that is image data in a frame format. The sensor section 21 can be regarded as asynchronous (an asynchronous image sensor) in contrast to the synchronous image sensor since the sensor section 21 does not operate in synchronization with a vertical synchronization signal when outputting event data. Event detection may also be performed synchronously using a row scanner that determines which pixels generated an event during the past "frame" and assigns these events the same timestamp. Scan-type event detection is useful for moderate to high activity scenes since it incurs less readout overhead than arbiter-type, i.e. asynchronous, event detection.

Note that, the sensor section 21 can generate and output, other than event data, frame data, similarly to the synchronous image sensor. In addition, the sensor section 21 can output, together with event data, electrical signals of pixels in which events have occurred, as pixel signals that are pixel values of the pixels in frame data.

The logic section 22 controls the sensor section 21 as needed. Further, the logic section 22 performs various types of data processing, such as data processing of generating frame data on the basis of event data from the sensor section 21 and image processing on frame data from the sensor section 21 or frame data generated on the basis of the event data from the sensor section 21, and outputs data processing results obtained by performing the various types of data processing on the event data and the frame data.

Figure 2:
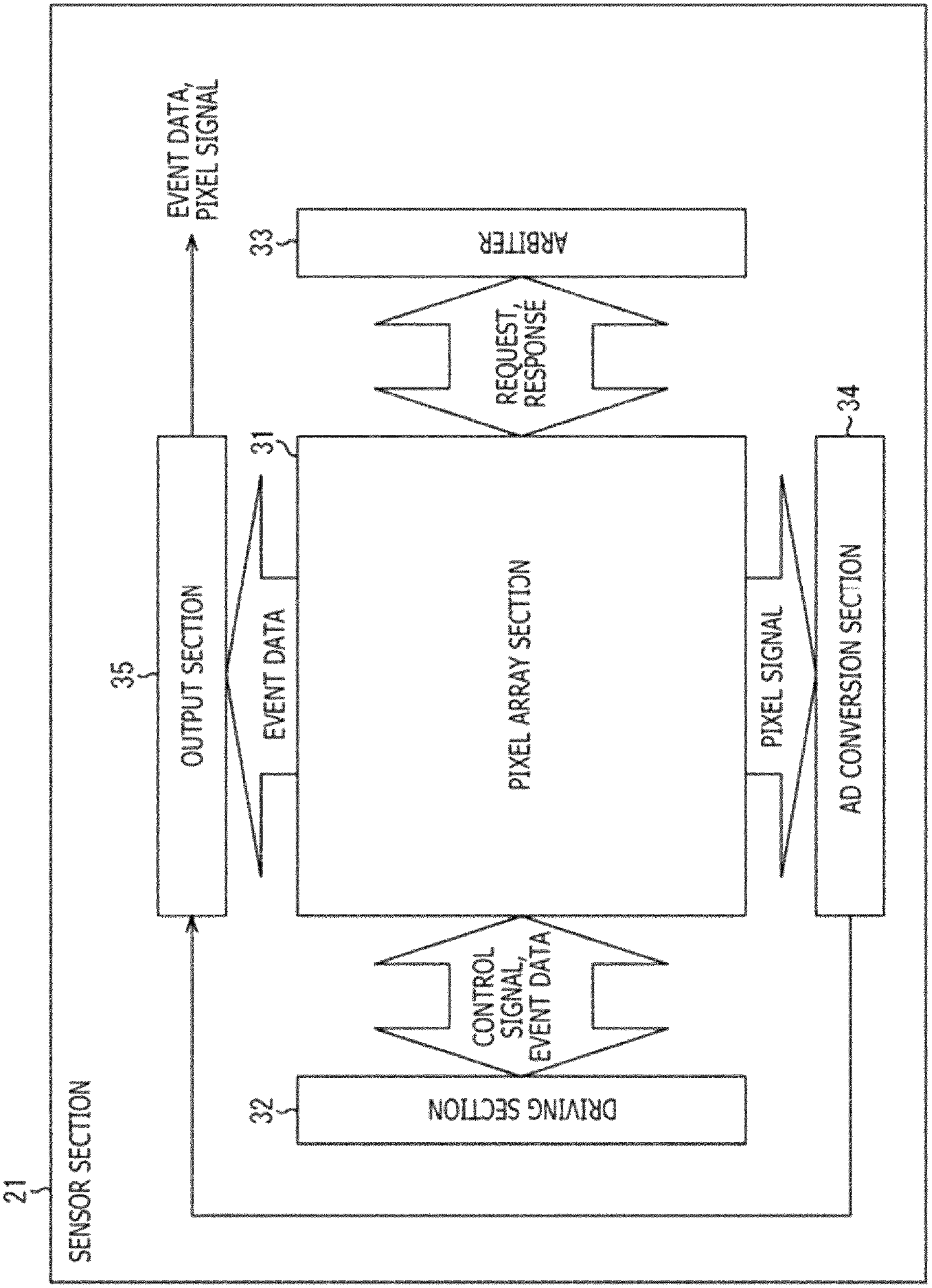
FIG. 2 is a schematic block diagram of a sensor section.

FIG. 2 is a block diagram illustrating a configuration example of the sensor section 21 of FIG. 1.

The sensor section 21 includes a pixel array section 31, a driving section 32, an arbiter 33, an AD (Analog to Digital) conversion section 34, and an output section 35.

The pixel array section 31 includes a plurality of pixels 51 (FIG. 3) arrayed in a two-dimensional lattice pattern. The pixel array section 31 detects, in a case where a change larger than a predetermined threshold (including a change equal to or larger than the threshold as needed) has occurred in (a voltage corresponding to) a photocurrent that is an electrical signal generated by photoelectric conversion in the pixel 51, the change in the photocurrent as an event. In a case of detecting an event, the pixel array section 31 outputs, to the arbiter 33, a request for requesting the output of event data indicating the occurrence of the event. Then, in a case of receiving a response indicating event data output permission from the arbiter 33, the pixel array section 31 outputs the event data to the driving section 32 and the output section 35. In addition, the pixel array section 31 outputs an electrical signal of the pixel 51 in which the event has been detected to the AD conversion section 34, as a pixel signal.

The driving section 32 supplies control signals to the pixel array section 31 to drive the pixel array section 31. For example, the driving section 32 drives the pixel 51 regarding which the pixel array section 31 has output event data, so that the pixel 51 in question supplies (outputs) a pixel signal to the AD conversion section 34.

The arbiter 33 arbitrates the requests for requesting the output of event data from the pixel array section 31, and returns responses indicating event data output permission or prohibition to the pixel array section 31.

The AD conversion section 34 includes, for example, a single-slope ADC (AD converter) (not illustrated) in each column of pixel blocks 41 (FIG. 3) described later, for example. The AD conversion section 34 performs, with the ADC in each column, AD conversion on pixel signals of the pixels 51 of the pixel blocks 41 in the column, and supplies the resultant to the output section 35. Note that, the AD conversion section 34 can perform CDS (Correlated Double Sampling) together with pixel signal AD conversion.

The output section 35 performs necessary processing on the pixel signals from the AD conversion section 34 and the event data from the pixel array section 31 and supplies the resultant to the logic section 22 (FIG. 1).

Here, a change in the photocurrent generated in the pixel 51 can be recognized as a change in the amount of light entering the pixel 51, so that it can also be said that an event is a change in light amount (a change in light amount larger than the threshold) in the pixel 51.

Event data indicating the occurrence of an event at least includes location information (coordinates or the like) indicating the location of a pixel block in which a change in light amount, which is the event, has occurred. Besides, the event data can also include the polarity (positive or negative) of the change in light amount.

With regard to the series of event data that is output from the pixel array section 31 at timings at which events have occurred, it can be said that, as long as the event data interval is the same as the event occurrence interval, the event data implicitly includes time point information indicating (relative) time points at which the events have occurred. However, for example, when the event data is stored in a memory and the event data interval is no longer the same as the event occurrence interval, the time point information implicitly included in the event data is lost. Thus, the output section 35 includes, in event data, time point information indicating (relative) time points at which events have occurred, such as timestamps, before the event data interval is changed from the event occurrence interval. The processing of including time point information in event data can be performed in any block other than the output section 35 as long as the processing is performed before time point information implicitly included in event data is lost.

Figure 3:
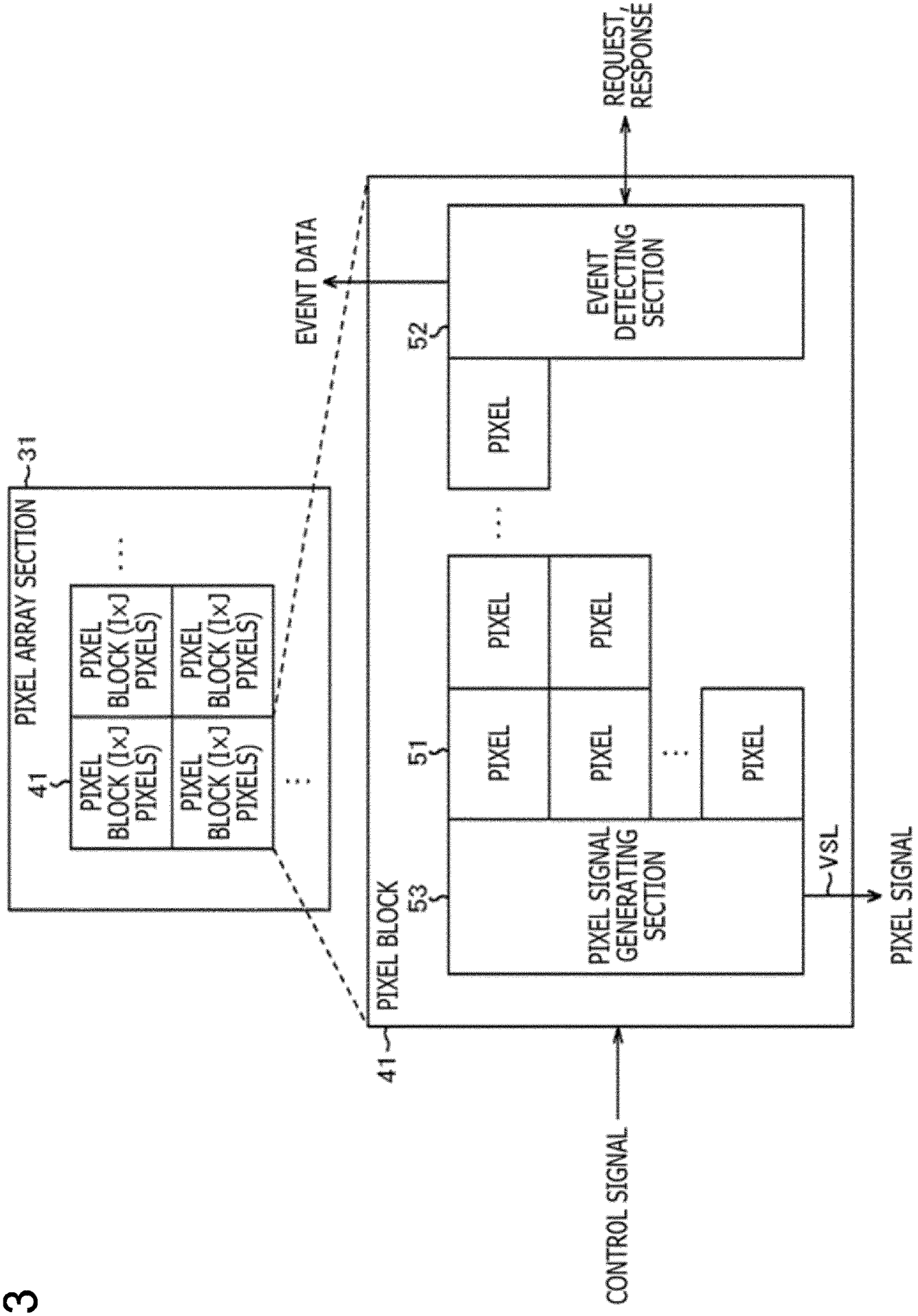
FIG. 3 is a schematic block diagram of a pixel array section.

FIG. 3 is a block diagram illustrating a configuration example of the pixel array section 31 of FIG. 2.

The pixel array section 31 includes the plurality of pixel blocks 41. The pixel block 41 includes the I×J pixels 51 that are one or more pixels arrayed in I rows and J columns (I and J are integers), an event detecting section 52, and a pixel signal generating section 53. The one or more pixels 51 in the pixel block 41 share the event detecting section 52 and the pixel signal generating section 53. Further, in each column of the pixel blocks 41, a VSL (Vertical Signal Line) for connecting the pixel blocks 41 to the ADC of the AD conversion section 34 is wired.

The pixel 51 receives light incident from an object and performs photoelectric conversion to generate a photocurrent serving as an electrical signal. The pixel 51 supplies the photocurrent to the event detecting section 52 under the control of the driving section 32.

The event detecting section 52 detects, as an event, a change larger than the predetermined threshold in photocurrent from each of the pixels 51, under the control of the driving section 32. In a case of detecting an event, the event detecting section 52 supplies, to the arbiter 33 (FIG. 2), a request for requesting the output of event data indicating the occurrence of the event. Then, when receiving a response indicating event data output permission to the request from the arbiter 33, the event detecting section 52 outputs the event data to the driving section 32 and the output section 35.

The pixel signal generating section 53 generates, in the case where the event detecting section 52 has detected an event, a voltage corresponding to a photocurrent from the pixel 51 as a pixel signal, and supplies the voltage to the AD conversion section 34 through the VSL, under the control of the driving section 32.

Here, detecting a change larger than the predetermined threshold in photocurrent as an event can also be recognized as detecting, as an event, absence of change larger than the predetermined threshold in photocurrent. The pixel signal generating section 53 can generate a pixel signal in the case where absence of change larger than the predetermined threshold in photocurrent has been detected as an event as well as in the case where a change larger than the predetermined threshold in photocurrent has been detected as an event.

Figure 4:
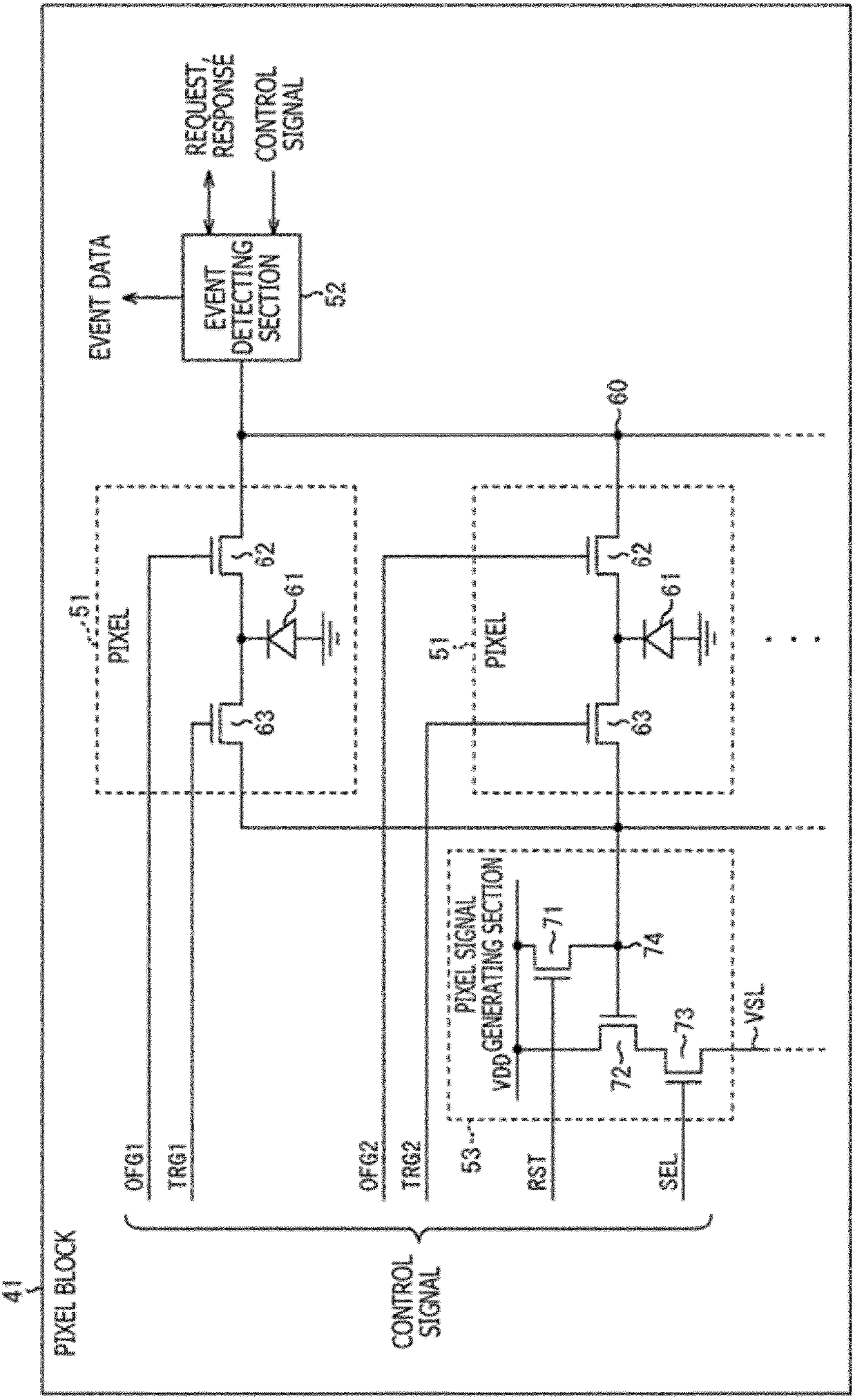
FIG. 4 is a schematic circuit diagram of a pixel block.

FIG. 4 is a circuit diagram illustrating a configuration example of the pixel block 41.

The pixel block 41 includes, as described with reference to FIG. 3, the pixels 51, the event detecting section 52, and the pixel signal generating section 53.

The pixel 51 includes a photoelectric conversion element 61 and transfer transistors 62 and 63.

The photoelectric conversion element 61 includes, for example, a PD (Photodiode). The photoelectric conversion element 61 receives incident light and performs photoelectric conversion to generate charges.

The transfer transistor 62 includes, for example, an N (Negative)-type MOS (Metal-Oxide-Semiconductor) FET (Field Effect Transistor). The transfer transistor 62 of the n-th pixel 51 of the I×J pixels 51 in the pixel block 41 is turned on or off in response to a control signal OFGn supplied from the driving section 32 (FIG. 2). When the transfer transistor 62 is turned on, charges generated in the photoelectric conversion element 61 are transferred (supplied) to the event detecting section 52, as a photocurrent.

The transfer transistor 63 includes, for example, an N-type MOSFET. The transfer transistor 63 of the n-th pixel 51 of the I×J pixels 51 in the pixel block 41 is turned on or off in response to a control signal TRGn supplied from the driving section 32. When the transfer transistor 63 is turned on, charges generated in the photoelectric conversion element 61 are transferred to an FD 74 of the pixel signal generating section 53.

The I×J pixels 51 in the pixel block 41 are connected to the event detecting section 52 of the pixel block 41 through nodes 60. Thus, photocurrents generated in (the photoelectric conversion elements 61 of) the pixels 51 are supplied to the event detecting section 52 through the nodes 60. As a result, the event detecting section 52 receives the sum of photocurrents from all the pixels 51 in the pixel block 41. Thus, the event detecting section 52 detects, as an event, a change in sum of photocurrents supplied from the I×J pixels 51 in the pixel block 41.

The pixel signal generating section 53 includes a reset transistor 71, an amplification transistor 72, a selection transistor 73, and the FD (Floating Diffusion) 74.

The reset transistor 71, the amplification transistor 72, and the selection transistor 73 include, for example, N-type MOSFETs.

The reset transistor 71 is turned on or off in response to a control signal RST supplied from the driving section 32

(FIG. 2). When the reset transistor 71 is turned on, the FD 74 is connected to a power supply VDD, and charges accumulated in the FD 74 are thus discharged to the power supply VDD. With this, the FD 74 is reset.

The amplification transistor 72 has a gate connected to the FD 74, a drain connected to the power supply VDD, and a source connected to the VSL through the selection transistor 73. The amplification transistor 72 is a source follower and outputs a voltage (electrical signal) corresponding to the voltage of the FD 74 supplied to the gate to the VSL through the selection transistor 73.

The selection transistor 73 is turned on or off in response to a control signal SEL supplied from the driving section 32. When the selection transistor 73 is turned on, a voltage corresponding to the voltage of the FD 74 from the amplification transistor 72 is output to the VSL.

The FD 74 accumulates charges transferred from the photoelectric conversion elements 61 of the pixels 51 through the transfer transistors 63, and converts the charges to voltages.

With regard to the pixels 51 and the pixel signal generating section 53, which are configured as described above, the driving section 32 turns on the transfer transistors 62 with control signals OFGn, so that the transfer transistors 62 supply, to the event detecting section 52, photocurrents based on charges generated in the photoelectric conversion elements 61 of the pixels 51. With this, the event detecting section 52 receives a current that is the sum of the photocurrents from all the pixels 51 in the pixel block 41, which might also be only a single pixel.

When the event detecting section 52 detects, as an event, a change in photocurrent (sum of photocurrents) in the pixel block 41, the driving section 32 turns off the transfer transistors 62 of all the pixels 51 in the pixel block 41, to thereby stop the supply of the photocurrents to the event detecting section 52. Then, the driving section 32 sequentially turns on, with the control signals TRGn, the transfer transistors 63 of the pixels 51 in the pixel block 41 in which the event has been detected, so that the transfer transistors 63 transfers charges generated in the photoelectric conversion elements 61 to the FD 74. The FD 74 accumulates the charges transferred from (the photoelectric conversion elements 61 of) the pixels 51. Voltages corresponding to the charges accumulated in the FD 74 are output to the VSL, as pixel signals of the pixels 51, through the amplification transistor 72 and the selection transistor 73.

As described above, in the sensor section 21 (FIG. 2), only pixel signals of the pixels 51 in the pixel block 41 in which an event has been detected are sequentially output to the VSL. The pixel signals output to the VSL are supplied to the AD conversion section 34 to be subjected to AD conversion.

Here, in the pixels 51 in the pixel block 41, the transfer transistors 63 can be turned on not sequentially but simultaneously. In this case, the sum of pixel signals of all the pixels 51 in the pixel block 41 can be output.

In the pixel array section 31 of FIG. 3, the pixel block 41 includes one or more pixels 51, and the one or more pixels 51 share the event detecting section 52 and the pixel signal generating section 53. Thus, in the case where the pixel block 41 includes a plurality of pixels 51, the numbers of the event detecting sections 52 and the pixel signal generating sections 53 can be reduced as compared to a case where the event detecting section 52 and the pixel signal generating section 53 are provided for each of the pixels 51, with the result that the scale of the pixel array section 31 can be reduced.

Note that, in the case where the pixel block 41 includes a plurality of pixels 51, the event detecting section 52 can be provided for each of the pixels 51. In the case where the plurality of pixels 51 in the pixel block 41 share the event detecting section 52, events are detected in units of the pixel blocks 41. In the case where the event detecting section 52 is provided for each of the pixels 51, however, events can be detected in units of the pixels 51.

Yet, even in the case where the plurality of pixels 51 in the pixel block 41 share the single event detecting section 52, events can be detected in units of the pixels 51 when the transfer transistors 62 of the plurality of pixels 51 are temporarily turned on in a time-division manner.

Further, in a case where there is no need to output pixel signals, the pixel block 41 can be formed without the pixel signal generating section 53. In the case where the pixel block 41 is formed without the pixel signal generating section 53, the sensor section 21 can be formed without the AD conversion section 34 and the transfer transistors 63. In this case, the scale of the sensor section 21 can be reduced. The sensor will then output the address of the pixel (block) in which the event occurred, if necessary with a time stamp.

Figure 5:
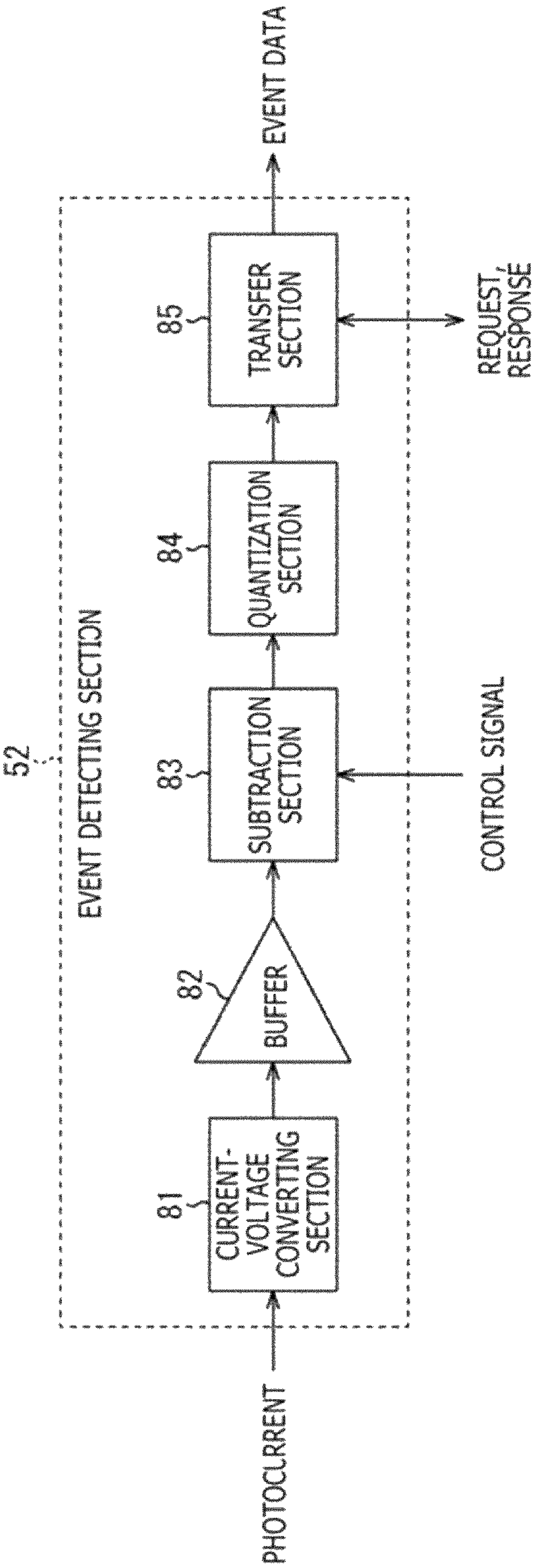
FIG. 5 is a schematic block diagram illustrating of an event detecting section.

FIG. 5 is a block diagram illustrating a configuration example of the event detecting section 52 of FIG. 3.

The event detecting section 52 includes a current-voltage converting section 81, a buffer 82, a subtraction section 83, a quantization section 84, and a transfer section 85.

The current-voltage converting section 81 converts (a sum of) photocurrents from the pixels 51 to voltages corresponding to the logarithms of the photocurrents (hereinafter also referred to as a "photovoltage") and supplies the voltages to the buffer 82.

The buffer 82 buffers photovoltages from the current-voltage converting section 81 and supplies the resultant to the subtraction section 83.

The subtraction section 83 calculates, at a timing instructed by a row driving signal that is a control signal from the driving section 32, a difference between the current photovoltage and a photovoltage at a timing slightly shifted from the current time, and supplies a difference signal corresponding to the difference to the quantization section 84.

The quantization section 84 quantizes difference signals from the subtraction section 83 to digital signals and supplies the quantized values of the difference signals to the transfer section 85 as event data.

The transfer section 85 transfers (outputs), on the basis of event data from the quantization section 84, the event data to the output section 35. That is, the transfer section 85 supplies a request for requesting the output of the event data to the arbiter 33. Then, when receiving a response indicating event data output permission to the request from the arbiter 33, the transfer section 85 outputs the event data to the output section 35.

Figure 6:
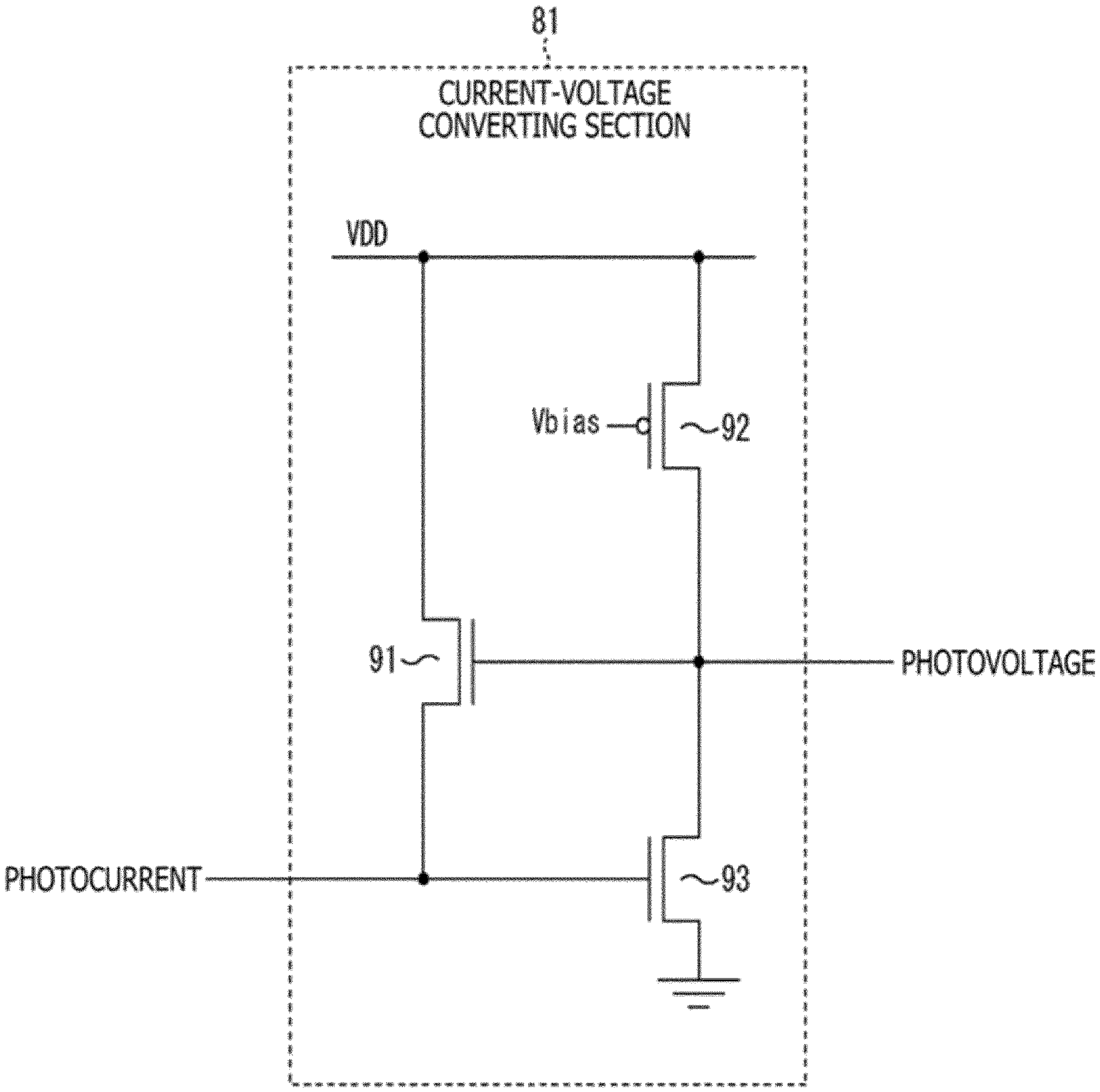
FIG. 6 is a schematic circuit diagram of a current-voltage converting section.

FIG. 6 is a circuit diagram illustrating a configuration example of the current-voltage converting section 81 of FIG. 5.

The current-voltage converting section 81 includes transistors 91 to 93. As the transistors 91 and 93, for example, N-type MOSFETs can be employed. As the transistor 92, for example, a P-type MOSFET can be employed.

The transistor 91 has a source connected to the gate of the transistor 93, and a photocurrent is supplied from the pixel 51 to the connecting point between the source of the transistor 91 and the gate of the transistor 93. The transistor 91 has a drain connected to the power supply VDD and a gate connected to the drain of the transistor 93.

The transistor 92 has a source connected to the power supply VDD and a drain connected to the connecting point between the gate of the transistor 91 and the drain of the transistor 93. A predetermined bias voltage Vbias is applied to the gate of the transistor 92. With the bias voltage Vbias, the transistor 92 is turned on or off, and the operation of the current-voltage converting section 81 is turned on or off depending on whether the transistor 92 is turned on or off.

The source of the transistor 93 is grounded.

In the current-voltage converting section 81, the transistor 91 has the drain connected on the power supply VDD side and is thus a source follower. The source of the transistor 91, which is the source follower, is connected to the pixels 51 (FIG. 4), so that photocurrents based on charges generated in the photoelectric conversion elements 61 of the pixels 51 flow through the transistor 91 (from the drain to the source). The transistor 91 operates in a subthreshold region, and at the gate of the transistor 91, photovoltages corresponding to the logarithms of the photocurrents flowing through the transistor 91 are generated. As described above, in the current-voltage converting section 81, the transistor 91 converts photocurrents from the pixels 51 to photovoltages corresponding to the logarithms of the photocurrents.

In the current-voltage converting section 81, the transistor 91 has the gate connected to the connecting point between the drain of the transistor 92 and the drain of the transistor 93, and the photovoltages are output from the connecting point in question.

Figure 7:
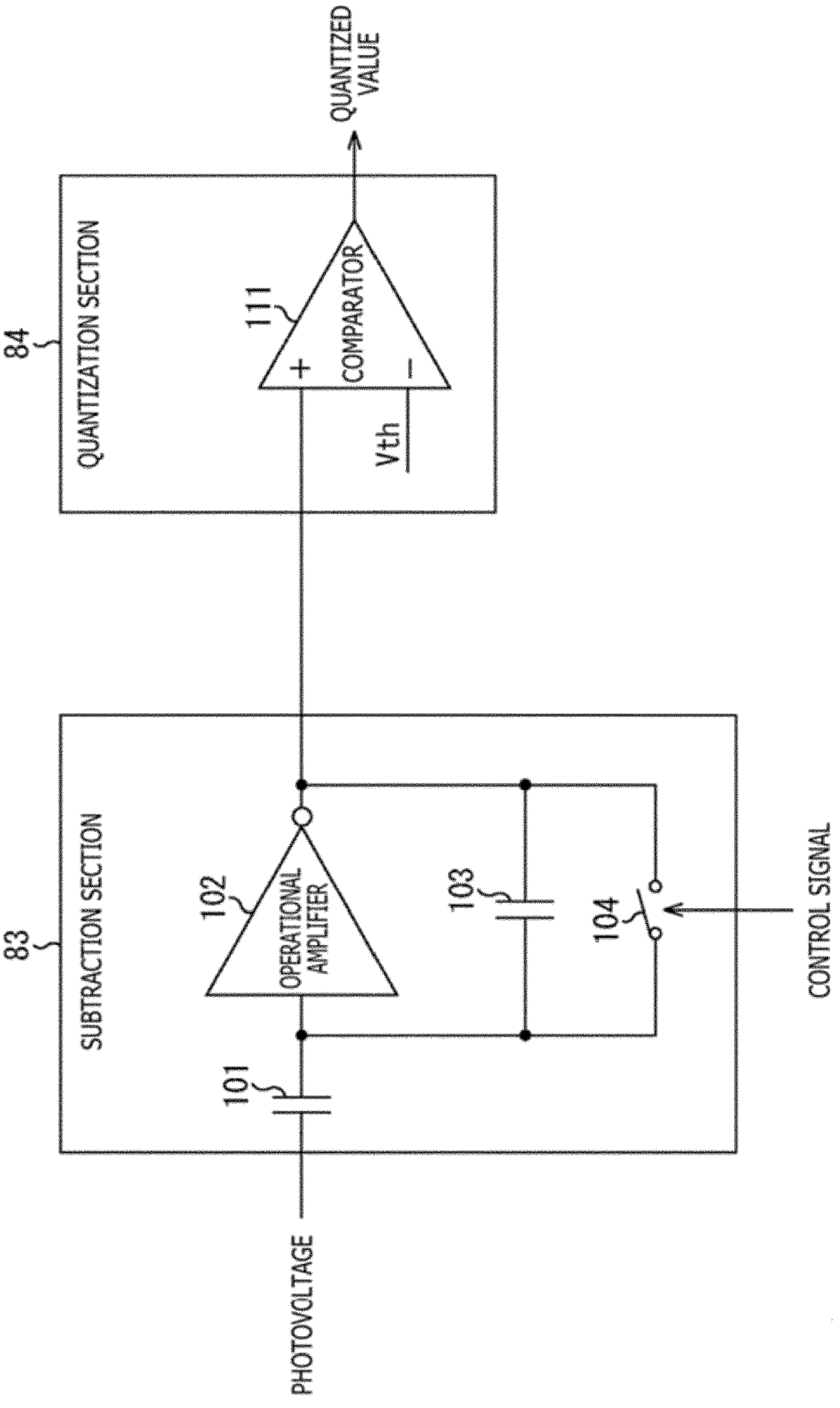
FIG. 7 is a schematic circuit diagram of a subtraction section and a quantization section.

FIG. 7 is a circuit diagram illustrating configuration examples of the subtraction section 83 and the quantization section 84 of FIG. 5.

The subtraction section 83 includes a capacitor 101, an operational amplifier 102, a capacitor 103, and a switch 104. The quantization section 84 includes a comparator 111.

The capacitor 101 has one end connected to the output terminal of the buffer 82 (FIG. 5) and the other end connected to the input terminal (inverting input terminal) of the operational amplifier 102. Thus, photovoltages are input to the input terminal of the operational amplifier 102 through the capacitor 101.

The operational amplifier 102 has an output terminal connected to the non-inverting input terminal (+) of the comparator 111.

The capacitor 103 has one end connected to the input terminal of the operational amplifier 102 and the other end connected to the output terminal of the operational amplifier 102.

The switch 104 is connected to the capacitor 103 to switch the connections between the ends of the capacitor 103. The switch 104 is turned on or off in response to a row driving signal that is a control signal from the driving section 32, to thereby switch the connections between the ends of the capacitor 103.

A photovoltage on the buffer 82 (FIG. 5) side of the capacitor 101 when the switch 104 is on is denoted by Vinit, and the capacitance (electrostatic capacitance) of the capacitor 101 is denoted by C1. The input terminal of the operational amplifier 102 serves as a virtual ground terminal, and a charge Qinit that is accumulated in the capacitor 101 in the case where the switch 104 is on is expressed by Expression (1).

$$Qinit = C1 \times Vinit \tag{1}$$

Further, in the case where the switch 104 is on, the connection between the ends of the capacitor 103 is cut (short-circuited), so that no charge is accumulated in the capacitor 103.

When a photovoltage on the buffer 82 (FIG. 5) side of the capacitor 101 in the case where the switch 104 has thereafter been turned off is denoted by Vafter, a charge Qafter that is accumulated in the capacitor 101 in the case where the switch 104 is off is expressed by Expression (2).

$$Qafter = C1 \times Vafter \tag{2}$$

When the capacitance of the capacitor 103 is denoted by C2 and the output voltage of the operational amplifier 102 is denoted by Vout, a charge Q2 that is accumulated in the capacitor 103 is expressed by Expression (3).

$$Q2 = -C2 \times Vout \tag{3}$$

Since the total amount of charges in the capacitors 101 and 103 does not change before and after the switch 104 is turned off, Expression (4) is established.

$$Qinit = Qafter + Q2 \tag{4}$$

When Expression (1) to Expression (3) are substituted for Expression (4), Expression (5) is obtained.

$$Vout = -(C1/C2) \times (Vafter - Vinit) \tag{5}$$

With Expression (5), the subtraction section 83 subtracts the photovoltage Vinit from the photovoltage Vafter, that is, calculates the difference signal (Vout) corresponding to a difference Vafter−Vinit between the photovoltages Vafter and Vinit. With Expression (5), the subtraction gain of the subtraction section 83 is C1/C2. Since the maximum gain is normally desired, C1 is preferably set to a large value and C2 is preferably set to a small value. Meanwhile, when C2 is too small, kTC noise increases, resulting in a risk of deteriorated noise characteristics. Thus, the capacitance C2 can only be reduced in a range that achieves acceptable noise. Further, since the pixel blocks 41 each have installed therein the event detecting section 52 including the subtraction section 83, the capacitances C1 and C2 have space constraints. In consideration of these matters, the values of the capacitances C1 and C2 are determined.

The comparator 111 compares a difference signal from the subtraction section 83 with a predetermined threshold (voltage) Vth (>0) applied to the inverting input terminal (−), thereby quantizing the difference signal. The comparator 111 outputs the quantized value obtained by the quantization to the transfer section 85 as event data.

For example, in a case where a difference signal is larger than the threshold Vth, the comparator 111 outputs an H (High) level indicating 1, as event data indicating the occurrence of an event. In a case where a difference signal is not larger than the threshold Vth, the comparator 111 outputs an L (Low) level indicating 0, as event data indicating that no event has occurred.

The transfer section 85 supplies a request to the arbiter 33 in a case where it is confirmed on the basis of event data from the quantization section 84 that a change in light amount that is an event has occurred, that is, in the case where the difference signal (Vout) is larger than the threshold Vth. When receiving a response indicating event data output permission, the transfer section 85 outputs the event data indicating the occurrence of the event (for example, H level) to the output section 35.

The output section 35 includes, in event data from the transfer section 85, location/address information regarding (the pixel block 41 including) the pixel 51 in which an event indicated by the event data has occurred and time point information indicating a time point at which the event has occurred, and further, as needed, the polarity of a change in light amount that is the event, i.e. whether the intensity did increase or decrease. The output section 35 outputs the event data.

As the data format of event data including location information regarding the pixel 51 in which an event has occurred, time point information indicating a time point at which the event has occurred, and the polarity of a change in light amount that is the event, for example, the data format called "AER (Address Event Representation)" can be employed.

Note that, a gain A of the entire event detecting section 52 is expressed by the following expression where the gain of the current-voltage converting section 81 is denoted by $CG_{log}$ and the gain of the buffer 82 is 1.

$$A = CG_{log}C1/C2\left(\sum i_{photo\_}n\right) \tag{6}$$

Here, $i_{photo}$ denotes a photocurrent of the n-th pixel 51 of the I×J pixels 51 in the pixel block 41. In Expression (6), Σ denotes the summation of n that takes integers ranging from 1 to I×J.

Note that, the pixel 51 can receive any light as incident light with an optical filter through which predetermined light passes, such as a color filter. For example, in a case where the pixel 51 receives visible light as incident light, event data indicates the occurrence of changes in pixel value in images including visible objects. Further, for example, in a case where the pixel 51 receives, as incident light, infrared light, millimeter waves, or the like for ranging, event data indicates the occurrence of changes in distances to objects. In addition, for example, in a case where the pixel 51 receives infrared light for temperature measurement, as incident light, event data indicates the occurrence of changes in temperature of objects. In the present embodiment, the pixel 51 is assumed to receive visible light as incident light.

Figure 8:
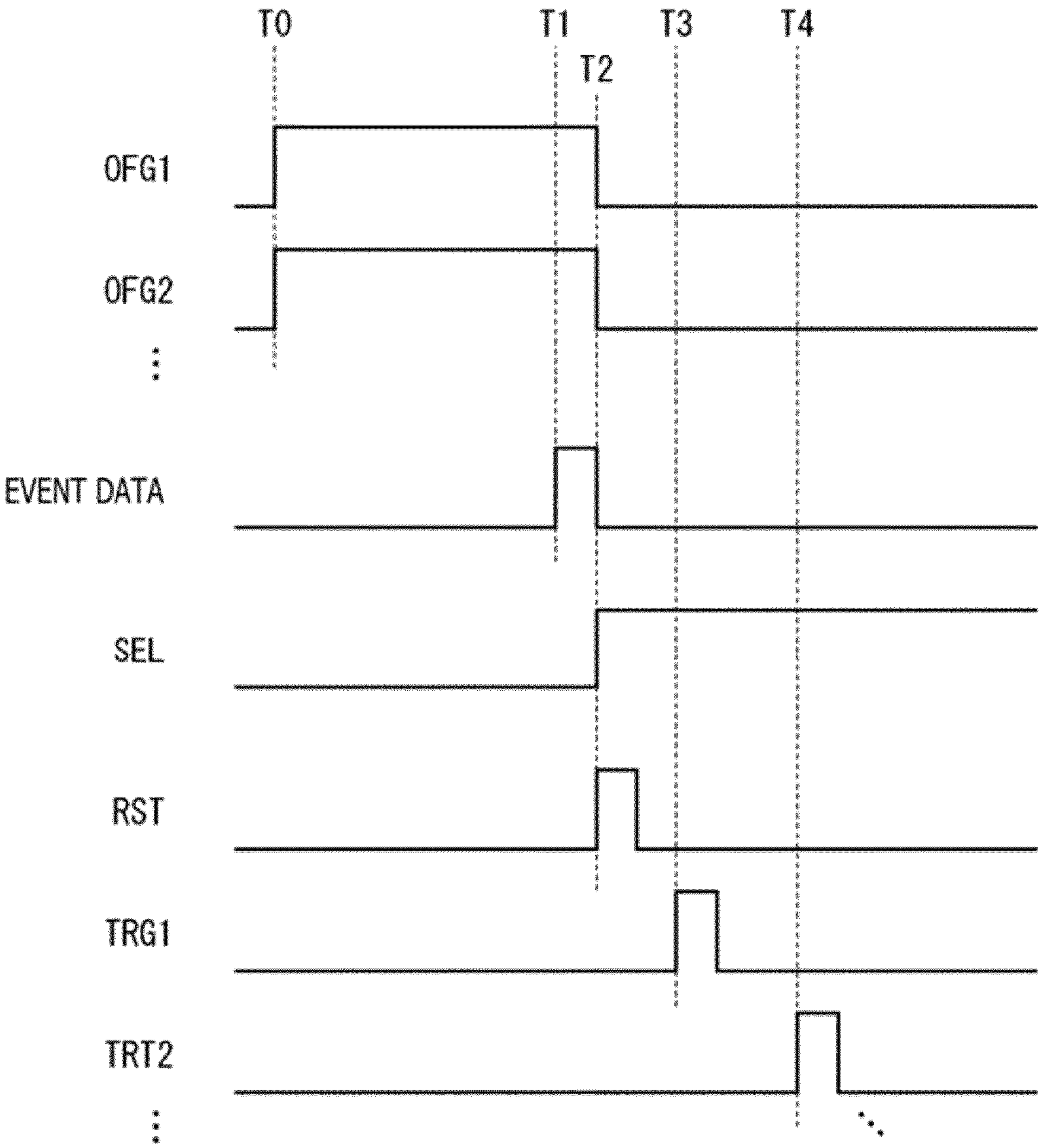
FIG. 8 is a schematic timing chart of an example operation of the sensor section.

FIG. 8 is a timing chart illustrating an example of the operation of the sensor section 21 of FIG. 2.

At Timing T0, the driving section 32 changes all the control signals OFGn from the L level to the H level, thereby turning on the transfer transistors 62 of all the pixels 51 in the pixel block 41. With this, the sum of photocurrents from all the pixels 51 in the pixel block 41 is supplied to the event detecting section 52. Here, the control signals TRGn are all at the L level, and hence the transfer transistors 63 of all the pixels 51 are off.

For example, at Timing T1, when detecting an event, the event detecting section 52 outputs event data at the H level in response to the detection of the event.

At Timing T2, the driving section 32 sets all the control signals OFGn to the L level on the basis of the event data at the H level, to stop the supply of the photocurrents from the pixels 51 to the event detecting section 52. Further, the driving section 32 sets the control signal SEL to the H level, and sets the control signal RST to the H level over a certain period of time, to control the FD 74 to discharge the charges to the power supply VDD, thereby resetting the FD 74. The pixel signal generating section 53 outputs, as a reset level, a pixel signal corresponding to the voltage of the FD 74 when the FD 74 has been reset, and the AD conversion section 34 performs AD conversion on the reset level.

At Timing T3 after the reset level AD conversion, the driving section 32 sets a control signal TRG1 to the H level over a certain period to control the first pixel 51 in the pixel block 41 in which the event has been detected to transfer, to the FD 74, charges generated by photoelectric conversion in (the photoelectric conversion element 61 of) the first pixel 51. The pixel signal generating section 53 outputs, as a signal level, a pixel signal corresponding to the voltage of the FD 74 to which the charges have been transferred from the pixel 51, and the AD conversion section 34 performs AD conversion on the signal level.

The AD conversion section 34 outputs, to the output section 35, a difference between the signal level and the reset level obtained after the AD conversion, as a pixel signal serving as a pixel value of the image (frame data).

Here, the processing of obtaining a difference between a signal level and a reset level as a pixel signal serving as a pixel value of an image is called "CDS." CDS can be performed after the AD conversion of a signal level and a reset level, or can be simultaneously performed with the AD conversion of a signal level and a reset level in a case where the AD conversion section 34 performs single-slope AD conversion. In the latter case, AD conversion is performed on the signal level by using the AD conversion result of the reset level as an initial value.

At Timing T4 after the AD conversion of the pixel signal of the first pixel 51 in the pixel block 41, the driving section 32 sets a control signal TRG2 to the H level over a certain period of time to control the second pixel 51 in the pixel block 41 in which the event has been detected to output a pixel signal.

In the sensor section 21, similar processing is executed thereafter, so that pixel signals of the pixels 51 in the pixel block 41 in which the event has been detected are sequentially output.

When the pixel signals of all the pixels 51 in the pixel block 41 are output, the driving section 32 sets all the control signals OFGn to the H level to turn on the transfer transistors 62 of all the pixels 51 in the pixel block 41.

Figure 9:
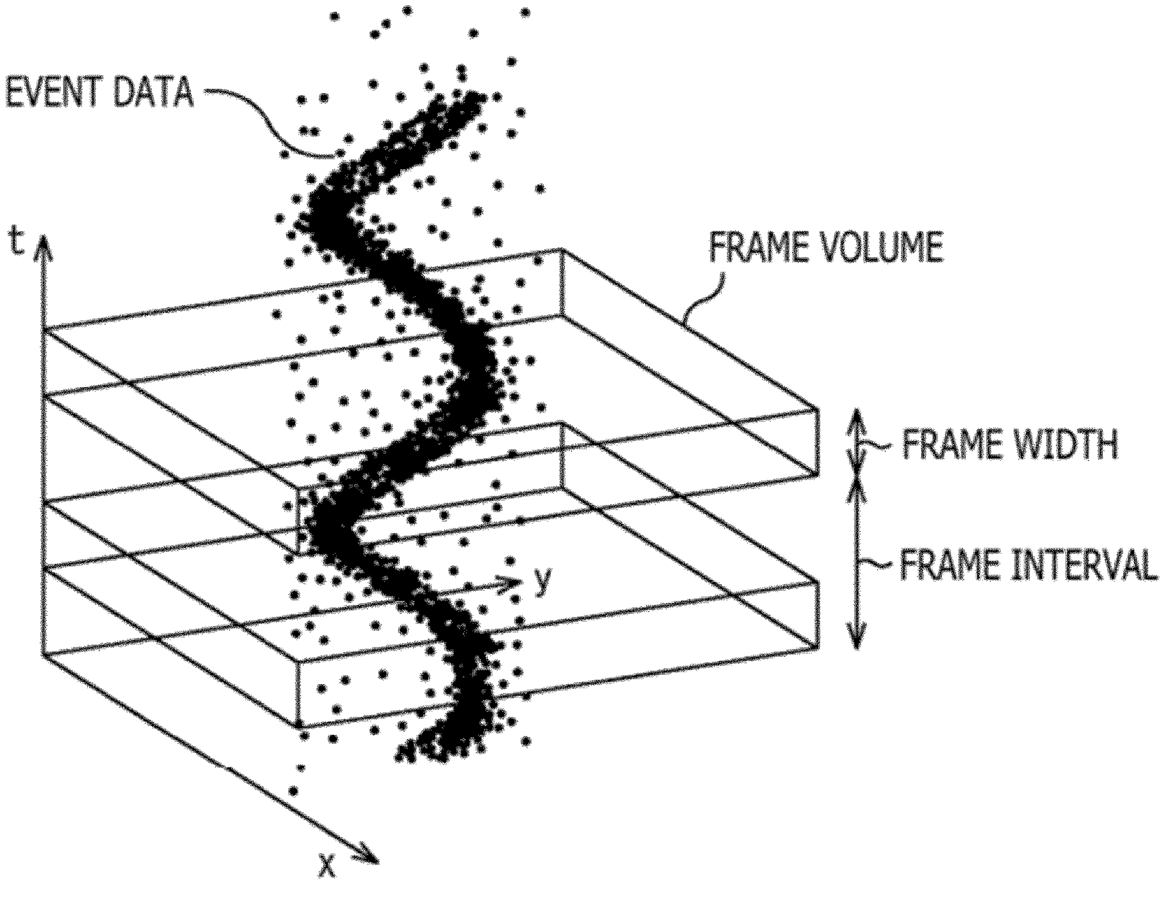
FIG. 9 is a schematic diagram of a frame data generation method based on event data.

FIG. 9 is a diagram illustrating an example of a frame data generation method based on event data.

The logic section 22 sets a frame interval and a frame width on the basis of an externally input command, for example. Here, the frame interval represents the interval of frames of frame data that is generated on the basis of event data. The frame width represents the time width of event data that is used for generating frame data on a single frame. A frame interval and a frame width that are set by the logic section 22 are also referred to as a "set frame interval" and a "set frame width," respectively.

The logic section 22 generates, on the basis of the set frame interval, the set frame width, and event data from the sensor section 21, frame data that is image data in a frame format, to thereby convert the event data to the frame data. That is, the logic section 22 generates, in each set frame interval, frame data on the basis of event data in the set frame width from the beginning of the set frame interval.

Here, it is assumed that event data includes time point information t, indicating a time point at which an event has occurred (hereinafter also referred to as an "event time point") and coordinates (x, y) serving as location information regarding (the pixel block 41 including) the pixel 51 in which the event has occurred (hereinafter also referred to as an "event location").

In FIG. 9, in a three-dimensional space (time and space) with the x axis, the y axis, and the time axis t, points representing event data are plotted on the basis of the event time point t and the event location (coordinates) (x, y) included in the event data.

That is, when a location (x, y, t) on the three-dimensional space indicated by the event time point t and the event location (x, y) included in event data is regarded as the space-time location of an event, in FIG. 9, the points representing the event data are plotted on the space-time locations (x, y, t) of the events.

The logic section 22 starts to generate frame data on the basis of event data by using, as a generation start time point at which frame data generation starts, a predetermined time point, for example, a time point at which frame data generation is externally instructed or a time point at which the sensor device 10 is powered on.

Here, cuboids each having the set frame width in the direction of the time axis t in the set frame intervals, which appear from the generation start time point, are referred to as a "frame volume." The size of the frame volume in the x-axis direction or the y-axis direction is equal to the number of the pixel blocks 41 or the pixels 51 in the x-axis direction or the y-axis direction, for example.

The logic section 22 generates, in each set frame interval, frame data on a single frame on the basis of event data in the frame volume having the set frame width from the beginning of the set frame interval.

Frame data can be generated by, for example, setting white to a pixel (pixel value) in a frame at the event location (x, y) included in event data and setting a predetermined color such as gray to pixels at other locations in the frame.

Besides, in a case where event data includes the polarity of a change in light amount that is an event, frame data can be generated in consideration of the polarity included in the event data. For example, white can be set to pixels in the case a positive polarity, while black can be set to pixels in the case of a negative polarity.

In addition, in the case where pixel signals of the pixels 51 are also output when event data is output as described with reference to FIG. 3 and FIG. 4, frame data can be generated on the basis of the event data by using the pixel signals of the pixels 51. That is, frame data can be generated by setting, in a frame, a pixel at the event location (x, y) (in a block corresponding to the pixel block 41) included in event data to a pixel signal of the pixel 51 at the location (x, y) and setting a predetermined color such as gray to pixels at other locations.

Note that, in the frame volume, there are a plurality of pieces of event data that are different in the event time point t but the same in the event location (x, y) in some cases. In this case, for example, event data at the latest or oldest event time point t can be prioritized. Further, in the case where event data includes polarities, the polarities of a plurality of pieces of event data that are different in the event time point t but the same in the event location (x, y) can be added together, and a pixel value based on the added value obtained by the addition can be set to a pixel at the event location (x, y).

Here, in a case where the frame width and the frame interval are the same, the frame volumes are adjacent to each other without any gap. Further, in a case where the frame interval is larger than the frame width, the frame volumes are arranged with gaps. In a case where the frame width is larger than the frame interval, the frame volumes are arranged to be partly overlapped with each other.

Figure 10:
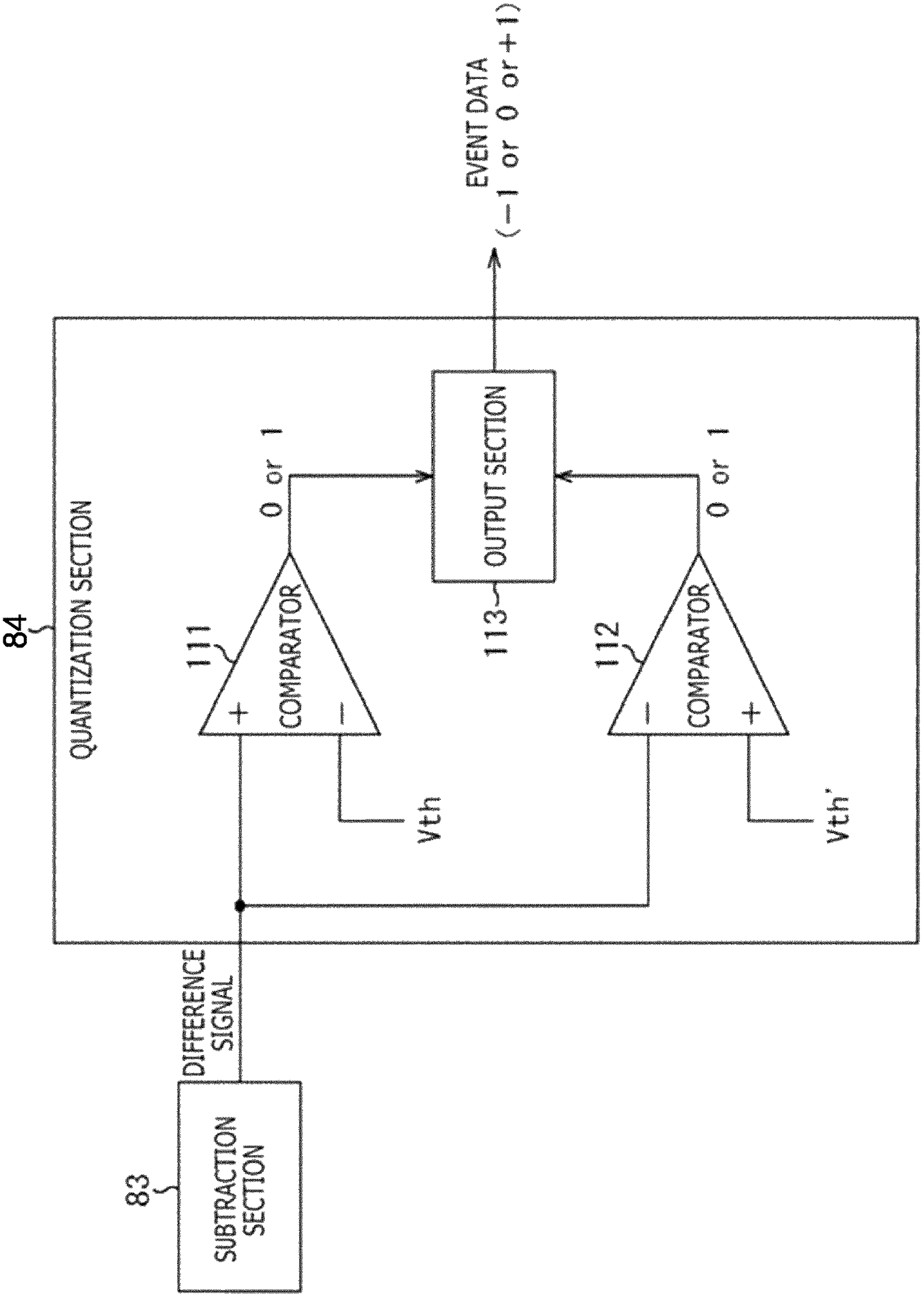
FIG. 10 is a schematic block diagram of another quantization section.

FIG. 10 is a block diagram illustrating another configuration example of the quantization section 84 of FIG. 5.

Note that, in FIG. 10, parts corresponding to those in the case of FIG. 7 are denoted by the same reference signs, and the description thereof is omitted as appropriate below.

In FIG. 10, the quantization section 84 includes comparators 111 and 112 and an output section 113.

Thus, the quantization section 84 of FIG. 10 is similar to the case of FIG. 7 in including the comparator 111. However, the quantization section 84 of FIG. 10 is different from the case of FIG. 7 in newly including the comparator 112 and the output section 113.

The event detecting section 52 (FIG. 5) including the quantization section 84 of FIG. 10 detects, in addition to events, the polarities of changes in light amount that are events.

In the quantization section 84 of FIG. 10, the comparator 111 outputs, in the case where a difference signal is larger than the threshold Vth, the H level indicating 1, as event data indicating the occurrence of an event having the positive polarity. The comparator 111 outputs, in the case where a difference signal is not larger than the threshold Vth, the L level indicating 0, as event data indicating that no event having the positive polarity has occurred.

Further, in the quantization section 84 of FIG. 10, a threshold Vth' (<Vth) is supplied to the non-inverting input terminal (+) of the comparator 112, and difference signals are supplied to the inverting input terminal (−) of the comparator 112 from the subtraction section 83. Here, for the sake of simple description, it is assumed that the threshold Vth' is equal to −Vth, for example, which needs however not to be the case.

The comparator 112 compares a difference signal from the subtraction section 83 with the threshold Vth' applied to the inverting input terminal (−), thereby quantizing the difference signal. The comparator 112 outputs, as event data, the quantized value obtained by the quantization.

For example, in a case where a difference signal is smaller than the threshold Vth' (the absolute value of the difference signal having a negative value is larger than the threshold Vth), the comparator 112 outputs the H level indicating 1, as event data indicating the occurrence of an event having the negative polarity. Further, in a case where a difference signal is not smaller than the threshold Vth' (the absolute value of the difference signal having a negative value is not larger than the threshold Vth), the comparator 112 outputs the L level indicating 0, as event data indicating that no event having the negative polarity has occurred.

The output section 113 outputs, on the basis of event data output from the comparators 111 and 112, event data indicating the occurrence of an event having the positive polarity, event data indicating the occurrence of an event having the negative polarity, or event data indicating that no event has occurred to the transfer section 85.

For example, the output section 113 outputs, in a case where event data from the comparator 111 is the H level indicating 1, +V volts indicating +1, as event data indicating the occurrence of an event having the positive polarity, to the transfer section 85. Further, the output section 113 outputs, in a case where event data from the comparator 112 is the H level indicating 1, −V volts indicating −1, as event data indicating the occurrence of an event having the negative polarity, to the transfer section 85. In addition, the output section 113 outputs, in a case where each event data from the comparators 111 and 112 is the L level indicating 0, 0 volts (GND level) indicating 0, as event data indicating that no event has occurred, to the transfer section 85.

The transfer section 85 supplies a request to the arbiter 33 in the case where it is confirmed on the basis of event data from the output section 113 of the quantization section 84 that a change in light amount that is an event having the positive polarity or the negative polarity has occurred. After receiving a response indicating event data output permission, the transfer section 85 outputs event data indicating the occurrence of the event having the positive polarity or the negative polarity (+V volts indicating 1 or −V volts indicating −1) to the output section 35.

Preferably, the quantization section 84 has a configuration as illustrated in FIG. 10.

Figure 11:
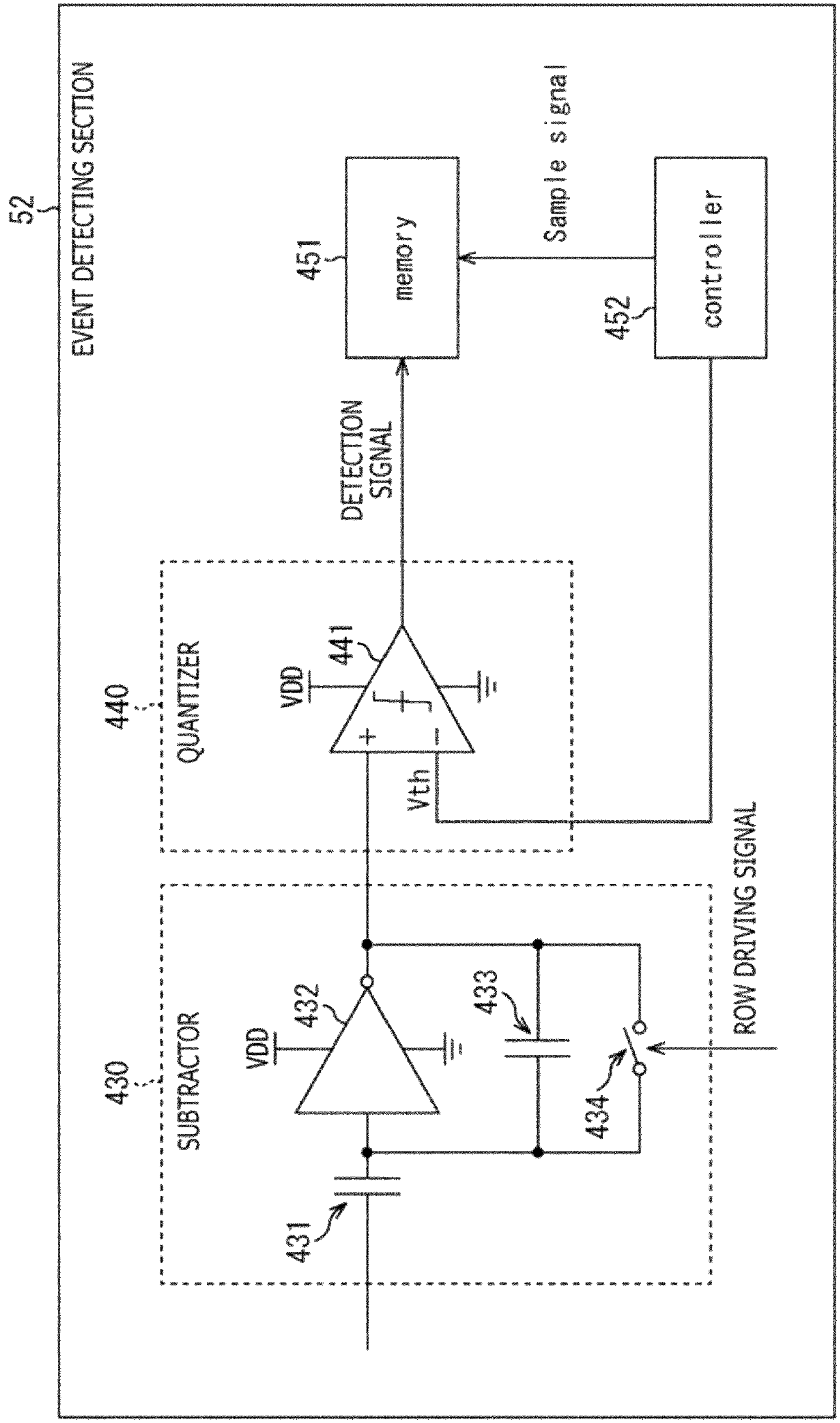
FIG. 11 is a schematic diagram of another event detecting section.

FIG. 11 is a diagram illustrating another configuration example of the event detecting section 52.

In FIG. 11, the event detecting section 52 includes a subtractor 430, a quantizer 440, a memory 451, and a controller 452. The subtractor 430 and the quantizer 440 correspond to the subtraction section 83 and the quantization section 84, respectively.

Note that, in FIG. 11, the event detecting section 52 further includes blocks corresponding to the current-voltage converting section 81 and the buffer 82, but the illustrations of the blocks are omitted in FIG. 11.

The subtractor 430 includes a capacitor 431, an operational amplifier 432, a capacitor 433, and a switch 434. The capacitor 431, the operational amplifier 432, the capacitor 433, and the switch 434 correspond to the capacitor 101, the operational amplifier 102, the capacitor 103, and the switch 104, respectively.

The quantizer 440 includes a comparator 441. The comparator 441 corresponds to the comparator 111.

The comparator 441 compares a voltage signal (difference signal) from the subtractor 430 with the predetermined threshold voltage Vth applied to the inverting input terminal (−). The comparator 441 outputs a signal indicating the comparison result, as a detection signal (quantized value).

The voltage signal from the subtractor 430 may be input to the input terminal (−) of the comparator 441, and the predetermined threshold voltage Vth may be input to the input terminal (+) of the comparator 441.

The controller 452 supplies the predetermined threshold voltage Vth applied to the inverting input terminal (−) of the comparator 441. The threshold voltage Vth which is supplied may be changed in a time-division manner. For example, the controller 452 supplies a threshold voltage Vth1 corresponding to ON events (for example, positive changes in photocurrent) and a threshold voltage Vth2 corresponding to OFF events (for example, negative changes in photocurrent) at different timings to allow the single comparator to detect a plurality of types of address events (events).

The memory 451 accumulates output from the comparator 441 on the basis of Sample signals supplied from the controller 452. The memory 451 may be a sampling circuit, such as a switch, plastic, or capacitor, or a digital memory circuit, such as a latch or flip-flop. For example, the memory 451 may hold, in a period in which the threshold voltage Vth2 corresponding to OFF events is supplied to the inverting input terminal (−) of the comparator 441, the result of comparison by the comparator 441 using the threshold voltage Vth1 corresponding to ON events. Note that, the memory 451 may be omitted, may be provided inside the pixel (pixel block 41), or may be provided outside the pixel.

Figure 12:
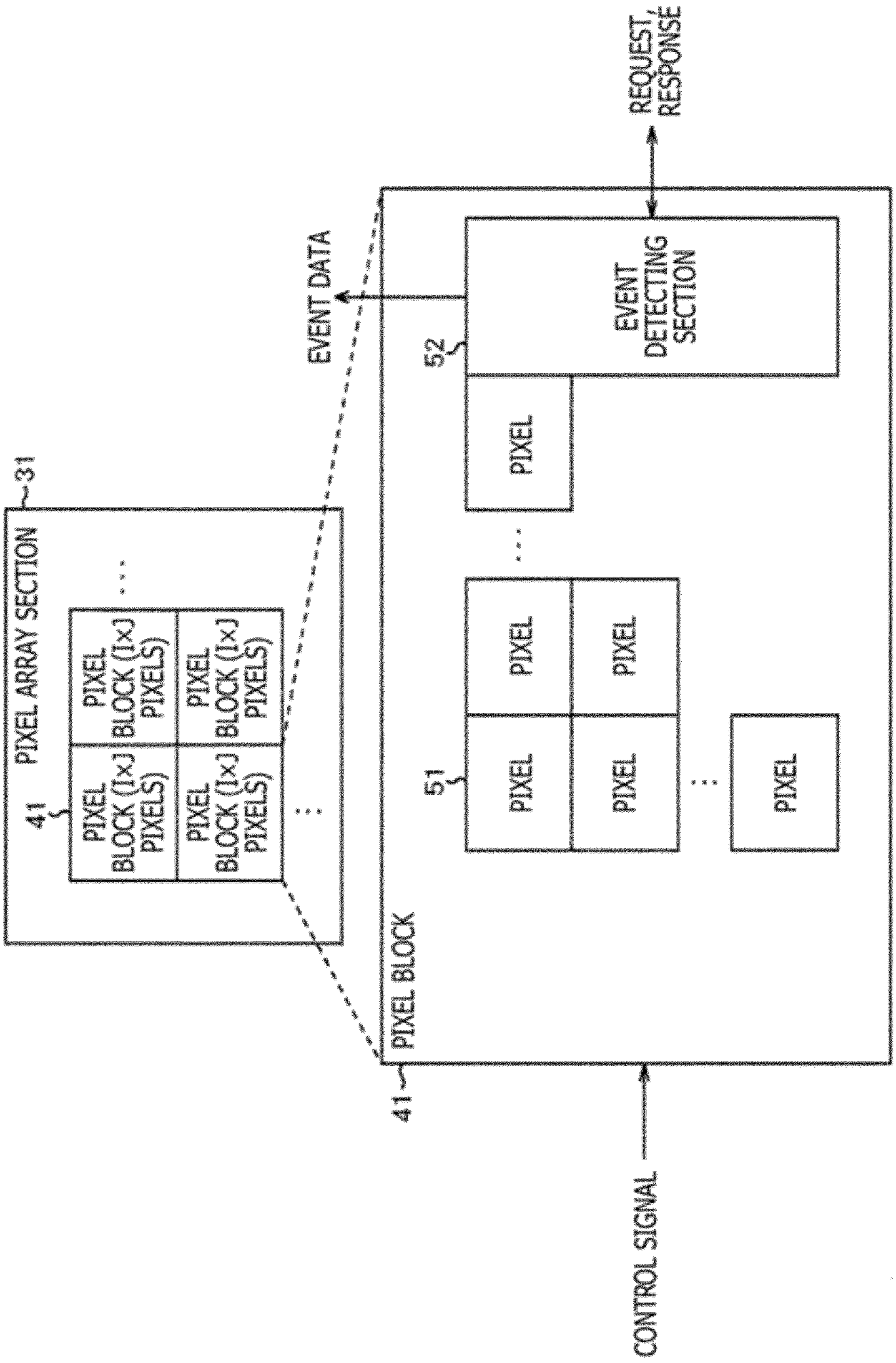
FIG. 12 is a schematic block diagram of another pixel array section.

FIG. 12 is a block diagram illustrating another configuration example of the pixel array section 31 of FIG. 2.

Note that, in FIG. 12, parts corresponding to those in the case of FIG. 3 are denoted by the same reference signs, and the description thereof is omitted as appropriate below.

In FIG. 12, the pixel array section 31 includes the plurality of pixel blocks 41. The pixel block 41 includes the I×J pixels 51 that are one or more pixels and the event detecting section 52.

Thus, the pixel array section 31 of FIG. 12 is similar to the case of FIG. 3 in that the pixel array section 31 includes the plurality of pixel blocks 41 and that the pixel block 41 includes one or more pixels 51 and the event detecting section 52. However, the pixel array section 31 of FIG. 12 is different from the case of FIG. 3 in that the pixel block 41 does not include the pixel signal generating section 53.

As described above, in the pixel array section 31 of FIG. 12, the pixel block 41 does not include the pixel signal generating section 53, so that the sensor section 21 (FIG. 2) can be formed without the AD conversion section 34.

Figure 13:
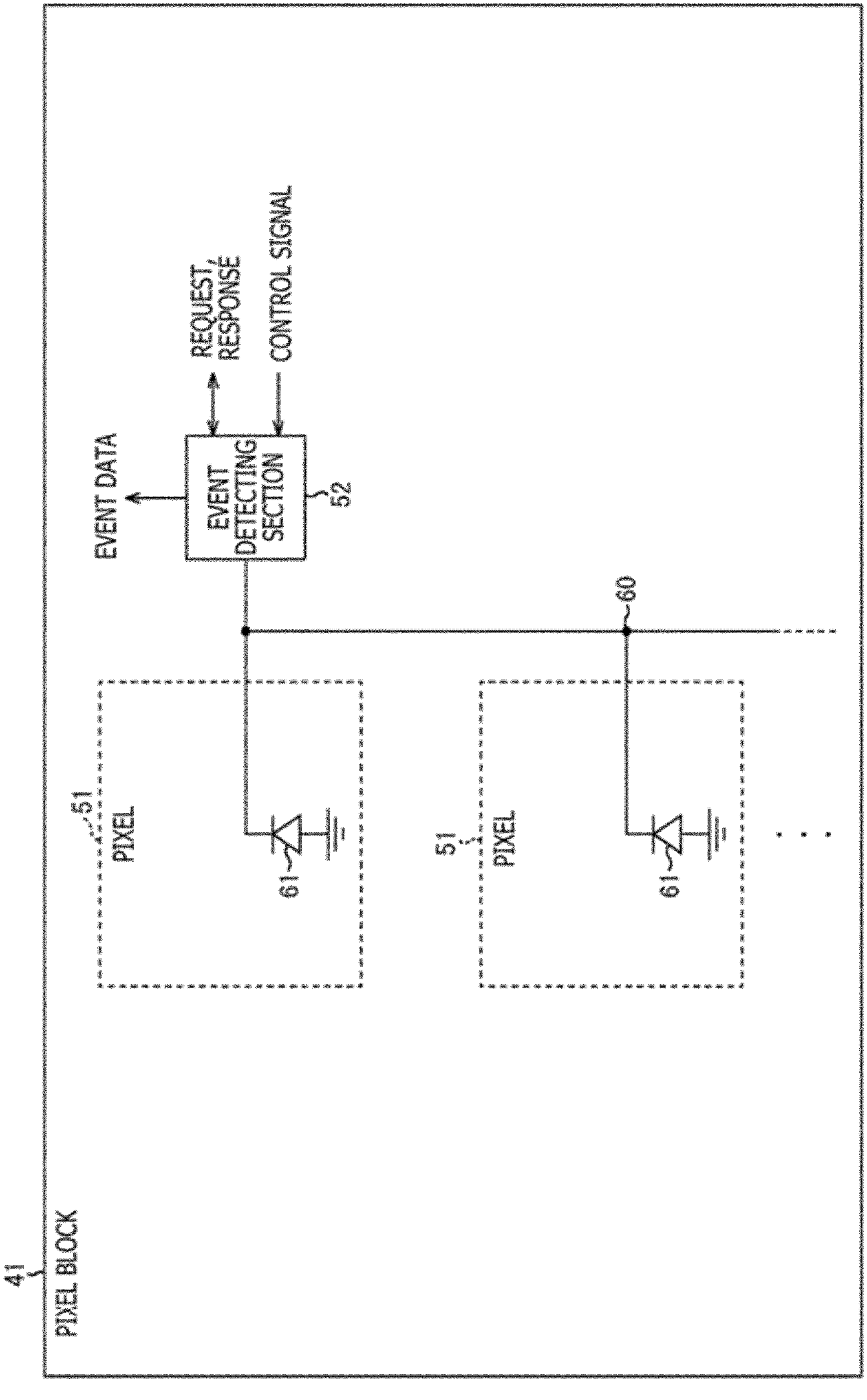
FIG. 13 is a schematic circuit diagram of another pixel block.

FIG. 13 is a circuit diagram illustrating a configuration example of the pixel block 41 of FIG. 12.

As described with reference to FIG. 12, the pixel block 41 includes the pixels 51 and the event detecting section 52, but does not include the pixel signal generating section 53.

In this case, the pixel 51 can only include the photoelectric conversion element 61 without the transfer transistors 62 and 63.

Note that, in the case where the pixel 51 has the configuration illustrated in FIG. 13, the event detecting section 52 can output a voltage corresponding to a photocurrent from the pixel 51, as a pixel signal.

Above, the sensor device 10 was described to be an asynchronous imaging device configured to read out events by the asynchronous readout system. However, the event readout system is not limited to the asynchronous readout system and may be the synchronous readout system. An imaging device to which the synchronous readout system is applied is a scan type imaging device that is the same as a general imaging device configured to perform imaging at a predetermined frame rate.

Figure 14:
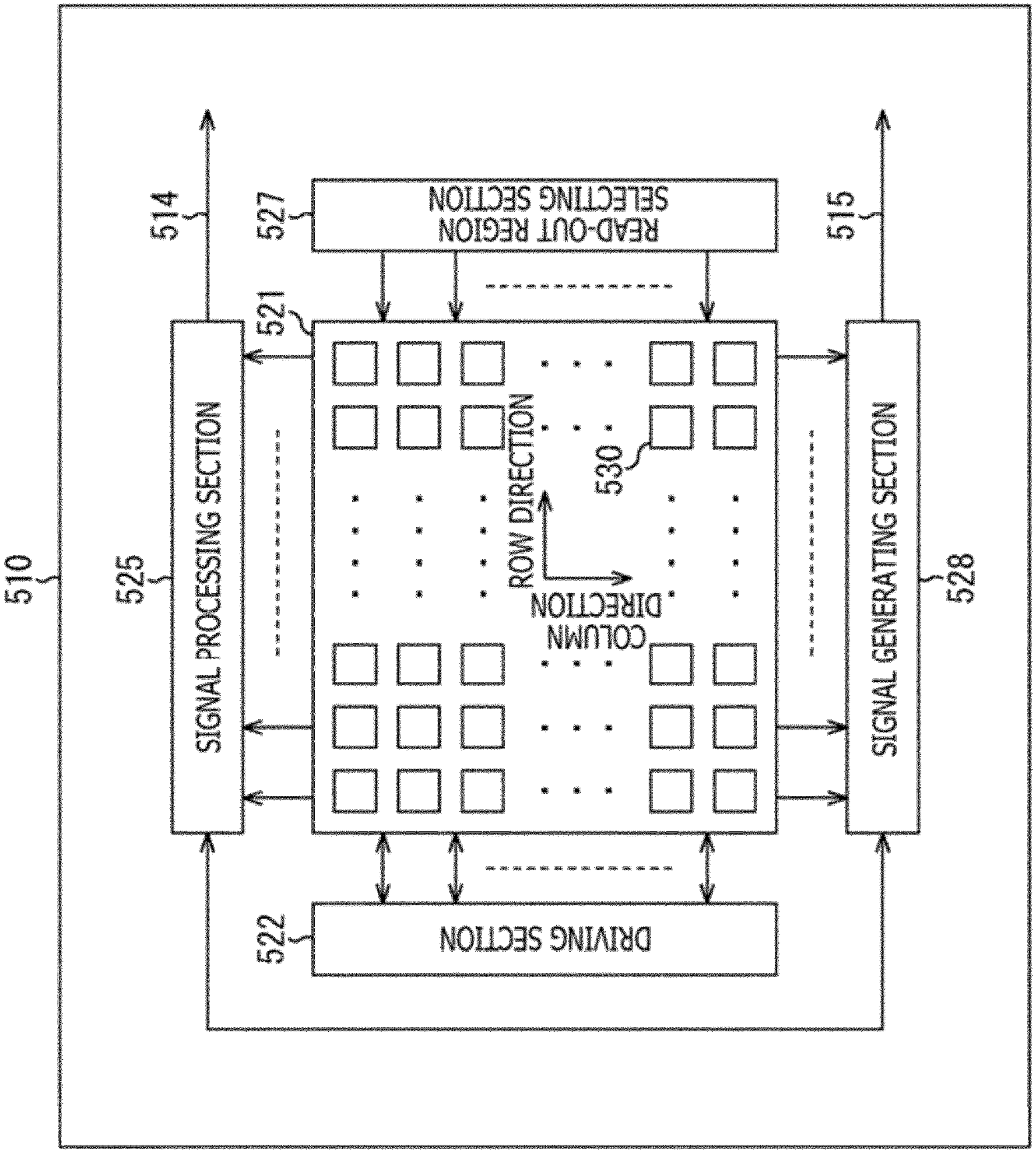
FIG. 14 is a schematic block diagram of a scan-type imaging device.

FIG. 14 is a block diagram illustrating a configuration example of a scan type imaging device.

As illustrated in FIG. 14, an imaging device 510 includes a pixel array section 521, a driving section 522, a signal processing section 525, a read-out region selecting section 527, and a signal generating section 528.

The pixel array section 521 includes a plurality of pixels 530. The plurality of pixels 530 each output an output signal in response to a selection signal from the read-out region selecting section 527. The plurality of pixels 530 can each include an in-pixel quantizer as illustrated in FIG. 11, for example. The plurality of pixels 530 output signals corresponding to the amounts of change in light intensity. The plurality of pixels 530 may be two-dimensionally disposed in a matrix as illustrated in FIG. 14.

The driving section 522 drives the plurality of pixels 530, so that the pixels 530 output pixel signals generated in the pixels 530 to the signal processing section 525 through an output line 514. Note that, the driving section 522 and the signal processing section 525 are circuit sections for acquiring grayscale information. Thus, in a case where only event information (event data) is acquired, the driving section 522 and the signal processing section 525 may be omitted.

The read-out region selecting section 527 selects some of the plurality of pixels 530 included in the pixel array section 521. For example, the read-out region selecting section 527 selects one or a plurality of rows included in the two-dimensional matrix structure corresponding to the pixel array section 521. The read-out region selecting section 527 sequentially selects one or a plurality of rows on the basis of a cycle set in advance. Further, the read-out region selecting section 527 may determine a selection region on the basis of requests from the pixels 530 in the pixel array section 521.

The signal generating section 528 generates, on the basis of output signals of the pixels 530 selected by the read-out region selecting section 527, event signals corresponding to active pixels in which events have been detected of the selected pixels 530. The events mean an event that the intensity of light changes. The active pixels mean the pixel 530 in which the amount of change in light intensity corresponding to an output signal exceeds or falls below a threshold set in advance. For example, the signal generating section 528 compares output signals from the pixels 530 with a reference signal, and detects, as an active pixel, a pixel that outputs an output signal larger or smaller than the reference signal. The signal generating section 528 generates an event signal (event data) corresponding to the active pixel.

The signal generating section 528 can include, for example, a column selecting circuit configured to arbitrate signals input to the signal generating section 528. Further, the signal generating section 528 can output not only information regarding active pixels in which events have been detected, but also information regarding non-active pixels in which no event has been detected.

The signal generating section 528 outputs, through an output line 515, address information and timestamp information (for example, (X, Y, T)) regarding the active pixels in which the events have been detected. However, the data that is output from the signal generating section 528 may not only be the address information and the timestamp information, but also information in a frame format (for example, (0, 0, 1, 0, . . . )).

In the above description photo currents generated in the pixels 51 are provided to event detection sections 52, where an electrical signal corresponding to the photo current is processed to decide whether or not the pixel 51 has seen an event, i.e. whether the received intensity has changed by more than a predetermined threshold.

In low illumination conditions the situation might arise that the change of intensity occurs in only such small intensity steps that the signal to noise ratio of each input to the event detection section 52 is so small that event detection becomes strongly affected by random noise. When the final resolution of the sensor device at low illumination conditions is of no interest, this problem can be solved by using one event detection section 52 for several pixels 51, as e.g. described with respect to FIG. 4 above. However, if the resolution of the pixels 51 is to be (partially) maintained, a more sophisticated approach has to be taken.

Figure 15:
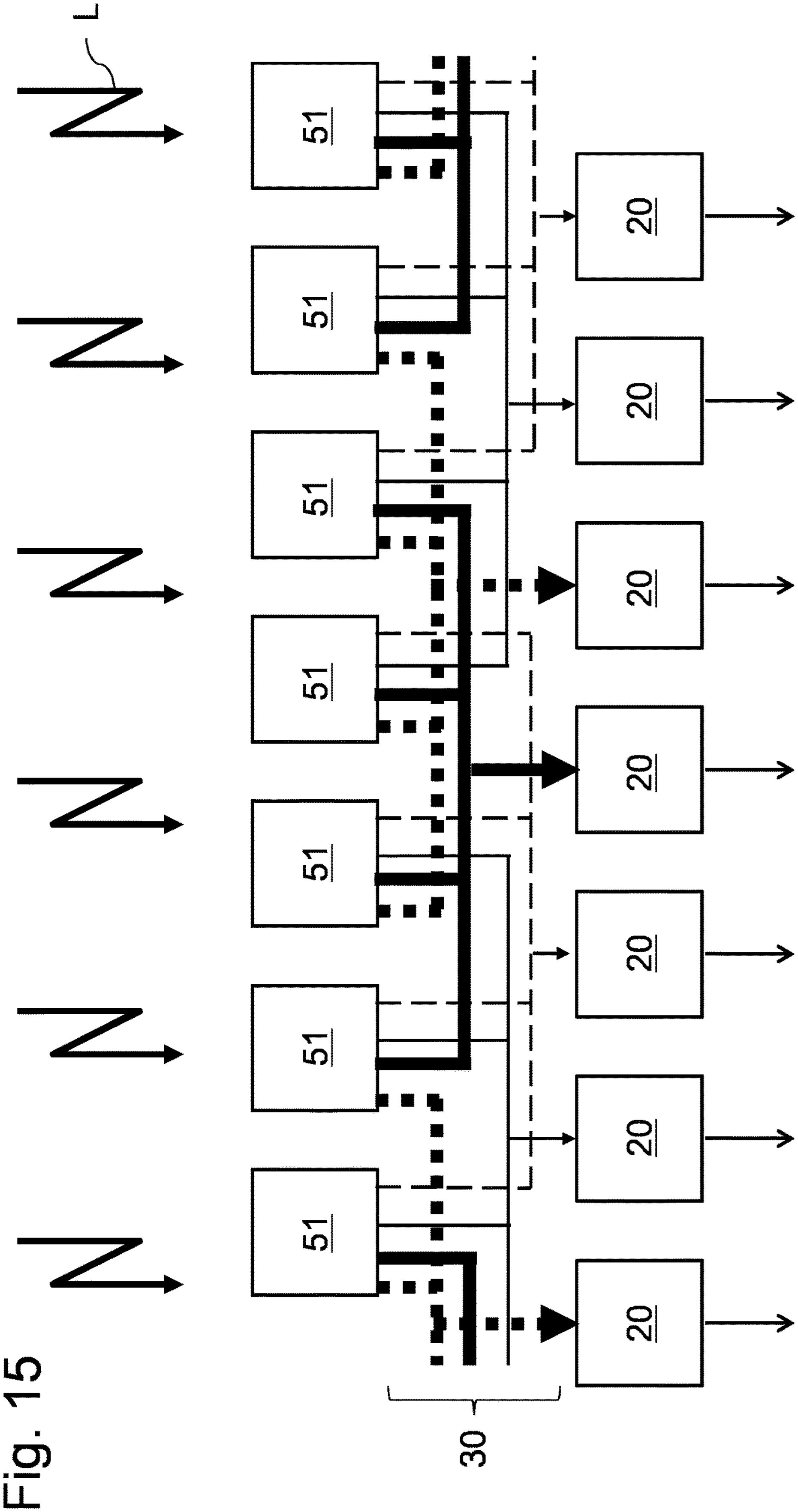
FIG. 15 is a schematic block diagram showing an exemplary connection between pixels and processing units.

FIG. 15 shows an example for such an approach. In the sensor device 10 as exemplified in FIG. 15 a plurality of pixels 51 is present, each of which is configured to receive light L and perform photoelectric conversion to generate an electrical signal. Further, a plurality of processing units 20 is present, each of which is configured to generate output signals based on the electrical signals generated by the pixels 51.

The pixels 51 can be constituted as e.g. described above with respect to FIGS. 3 and 4. The processing units 20 may e.g. be any part of the event detection section 52 as described above with respect to FIGS. 5 to 7. In particular, the processing units 20 may be constituted by the part of the event detection section 52 starting with the subtraction section 83, i.e. by the part of the event detection section 52 that operates on the photovoltages provided from the current-voltage converting section 81. Accordingly, in a situation in which one pixel 51 is assigned to one event detection section (i.e. only one pixel 51 per pixel block 41), one can interpret the term “pixel” to also comprise the current-voltage converting section 81 (and the buffer 82, if necessary). The electrical signal output by each pixel would then be a photovoltage instead of a photocurrent.

However, it has to be noted that this is merely exemplary. Also any other stage of the event detection section 52 or even processing stages located after the event detection section 52 may be understood as processing units 20. Further, the sensor device 10 may also comprise different processing functionalities that do not depend on event detection, and may even not be a DVS/EVS. These processing functionalities are carried out by (different) processing units 20, too, whose outputs deteriorate, if the input signals become too noisy As schematically suggested in FIG. 15, the pixels 51 and the processing units 20 are connected by circuitry 30 in such a manner that there is not only a combination of electrical signals of the pixels 51 that reaches a single processing unit 20, but that also the electrical signal of a single pixel 51 is shared between or replicated towards different processing units 20. Differently stated, the circuitry 30 connects the plurality of pixels 51 and the plurality of processing units 20 such that information on the electrical signal generated by at least one of the pixels 51 is provided to at least two processing units 20, and such that at least one of said processing units 20 is provided with information on electrical signals from at least two pixels 51.

Thus, not only is the signal strength of several pixels 51 combined to obtain a higher signal to noise ratio, also the number of combinations of the pixel signals is increased to provide different processing units 20 with different, i.e. linear independent, combinations of electrical signals.

In the example shown in FIG. 15 four pixels 51 are grouped to provide their output signals to one processing unit 20. At the same time, each pixel provides its output to four processing units 20. In this manner, each processing unit 20 obtains a different combination of pixel output signals, while the number of processing units 20 is equal to the number of pixels 51. Thus, while the combination of the single electrical signals of different pixels enhances the signal to noise ratio of the input of the processing units 20, the achievable resolution is as high as if one processing unit 20 were assigned to just one pixel 51.

Here, it should be noted that FIG. 15 provides no information regarding the relative arrangement of pixels 51 and processing units 20 shown in the sensor device 10. While the one-dimensional arrangement of pixels 51 and processing units 20 shown in FIG. 15 could well be implemented, e.g. for each line of a pixel array, it has to be understood that the plurality of pixels 51 present in sensor device 10 can be grouped in an arbitrary manner to generate a connection pattern as shown in FIG. 15. Thus, while pixels 51 feeding a single processing unit 20 may be adjacent and/or arranged in a regular pattern, said pixels 51 may also be freely distributed among the plurality of pixels 51.

Further, the connection between pixels 51 and processing units 20 is also not restricted to a four-to-four relation as shown in FIG. 15. More generally, the circuitry 30 may connect the plurality of pixels 51 and the plurality of processing units 20 such that at least a part of the pixels 51 each provides information on their electrical signals to N processing units 20, and each of at least a part of the processing unit 20 is provided with information on electrical signals from N pixels 51, where N is a natural number. Thus, instead of a four-to-four relation, also an N-to-N relation may be used. Further, the connections need not be symmetric. Also N-to-M relations are possible, in which one processing unit 20 receives signals from N pixels 51, but where one pixel 51 shares its signal with M (M being different from N) processing units 20. In particular, as discussed below, the number of pixels 51 feeding one processing unit 20 may also be larger than the number of processing units 20 that receive the output signal of one single pixel 51. Further, it has to be kept in mind that in the edge region of a pixel array, it might not be possible or necessary to combine or split signals.

Figure 16A:
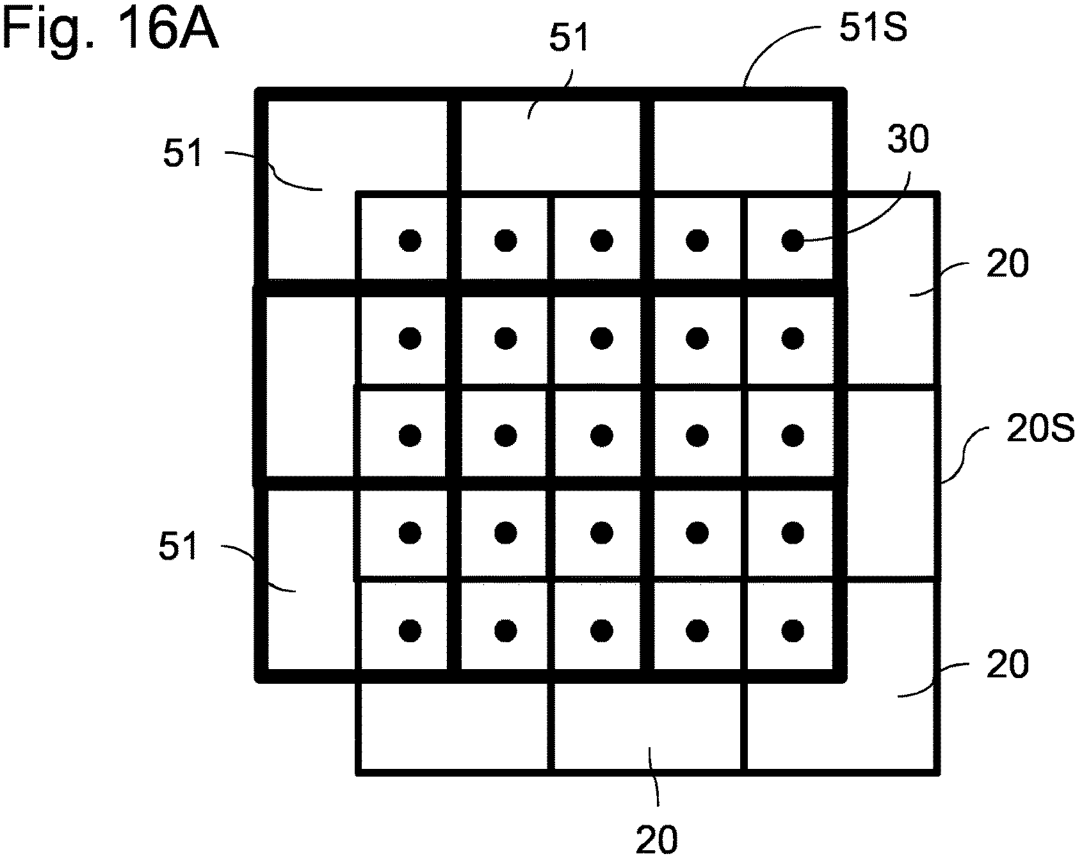
FIGS. 16A and 16B are schematic block diagrams showing further exemplary connections between pixels and processing units.
Figure 16B:
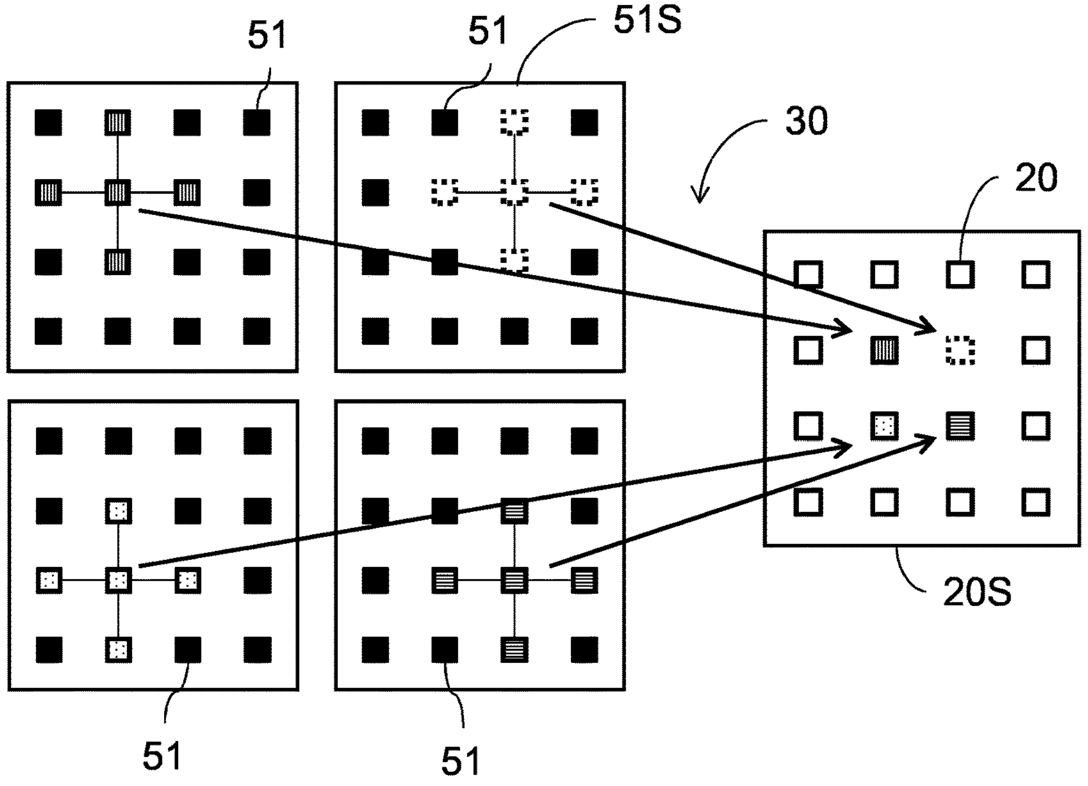

Further examples of possible connections between pixels 51 and processing units 20 are schematically shown in FIGS. 16A and 16B. In these figures the sensor device comprises at least two semiconductor substrates, wherein the plurality of pixels 51 is formed on a first semiconductor substrate 51S and the plurality of processing units 20 is formed on a second semiconductor substrate 20S that differs from the first semiconductor substrate 51S. These two substrates may be part of the sensor section 21 discussed with respect to FIGS. 1 and 2. The substrates are stacked together to form a three-dimensional integrated circuit, 3D-IC.

As shown schematically in FIG. 16A the first substrate 51S and the second substrate 20S may overlap such that regions containing (the circuitry of) a single pixel 51 and regions containing (the circuitry of) a single processing unit 20 are shifted such with respect to each other that one pixel 51 overlaps with four processing units 20 and vice versa. Here, the circuitry of one processing units 51 requires at maximum the same space as the circuitry of a single pixel 51. The circuitry 30 can then be easily implemented by vertical connections represented by black dots in FIG. 16A, e.g. by Cu—Cu connections. Here, pixels at the border of the pixel array will only be connected to one or two processing units, leading to a loss of frame size of a half pixel in each direction. However, each processing unit 20 receives information on output signals of four pixels 51, increasing the signal to noise ratio across the entire imaging area. Further, since central pixels 51 each share their signals with four processing units 20, the resolution at the center of the imaging area equals the resolution available from the pixels 51.

Again, instead of grouping 2×2 pixels 51 with one processing unit 20 any other pattern of N×M pixels 51 may be used. In this case, it might be necessary to use more involved connection lines than the simple vertical connections shown in FIG. 16A.

Further, it might also be possible to use different patterns or no pattern at all for grouping the pixels 51. FIG. 16B shows an example, in which five pixels 51 forming a cross are connected to the processing unit 20 arranged below the center pixel 51 of the cross. Thus, in this example, five pixel signals are binned to enhance the signal to noise ratio at one processing unit 20. In FIG. 16B this is shown for four central pixels 51 on the first substrate 51S and their respective mapping to the second substrate 20S. At the same time, each pixel 51 contributes to the input of five different processing units 20. Thus, the resolution stays at the level of the pixel resolution.

Here, according to the principle shown in FIG. 16B, it might also be possible to map pixels 51 to a processing unit 20 that are neither adjacent nor forming a regular pattern, if this is of advantage for the processing to be carried out by the processing unit.

For example, if directed to a depth estimation procedure based on structured light, sparsely distributed pixels might be grouped to one processing unit that resemble the expected reflection of the structured light pattern. If this pattern is captured by the pixels 51, it should form a strong common signal on at least the one processing unit 20 receiving its signal from the pixels 51 observing the structured light pattern. In this manner a sensor device 10 can be provided that is intrinsically sensitive to specific light patterns and allows therefore recognition of these patterns also for low illumination conditions.

According to this principle, the circuitry 30 may connect the plurality of pixels 51 and the plurality of processing units 20 such that the processing units 20 are provided with information on electrical signals from pixels 51 that are arranged in predetermined patterns.

For example an arrangement of N×N (or even N×M, with N≠M) pixels 51 can be partitioned such that it provides electrical signals to M processing units 20, where each pixel 51 is connected to multiple processing units 51 at the same time. All pixels 51 that feed into the same processing unit 51 form a cluster that represents a specific geometric pattern.

These patterns may be anisotropic and may serve as contour extractors. A cluster of pixels 51 will generate data if a matching contour is projected onto the sensor device 10. Here, different clusters work simultaneously and independent from each other, since each cluster is connected to its own processing unit 20. This allows detecting larger textures in the image, if one combines the responses of multiple neighboring clusters.

Here, in combining the electrical signals of the different pixels 51 of one cluster, different weights for each signal may be used. This allows prioritization of certain parts of a pattern that are considered particularly important.

Although this type of binning does not maintain the original pixel resolution, this might be acceptable since information about the shape of the observed object is gained while boosting the signal. Differently speaking, the loss of resolution at the output of the processing units is only a sign of the fact that this information is used for establishing intrinsic feature detection. Instead of producing a highly resolved output on which processing has to be executed to find specific features, the feature recognition is done "on the fly" due to the setup of the sensor device 10.

In this sense, such patterns can be thought of in a similar way as the kernels in a convolutional neural network, as each cluster reacts to a specific geometric constellation in the image, i.e. it is possible to detect contours such as edges or corners without further input.

Figure 17:
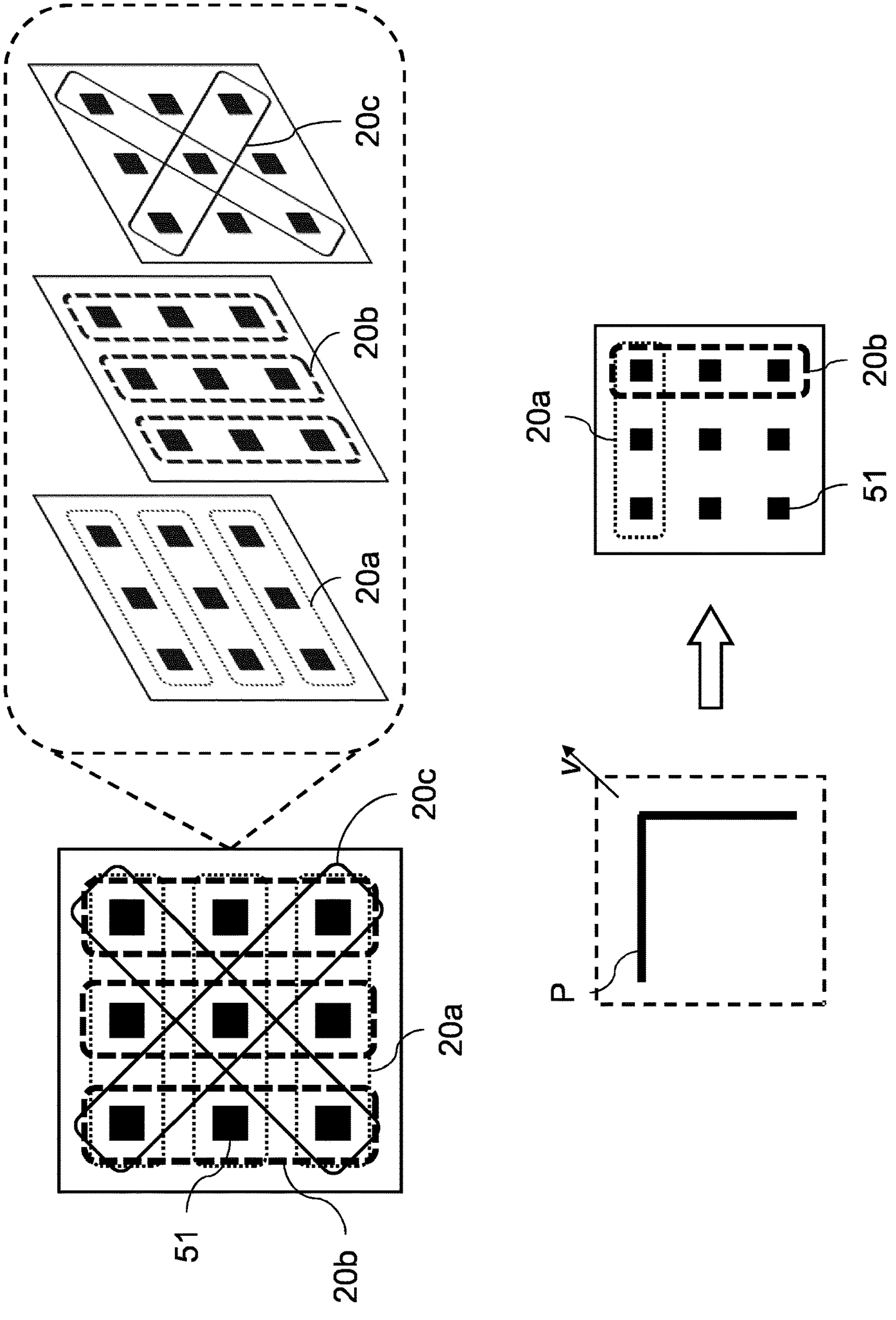
FIG. 17 is a schematic block diagram showing further exemplary connections between pixels and processing units.

An example for such an arrangement is illustrated in FIG. 17 for a 3×3 pixel block. The pixels 51 of this block are clustered in three different manners. First, three horizontal clusters 20*a* are formed. Second, three vertical clusters 20*b*, and third two diagonal clusters 20*c* are formed. Each cluster contains three pixels 51, the signals of which are combined and fed to the one processing unit 20 assigned to that cluster. At the same time each pixel 51 provides its signal to at least two of the in total eight processing units 20. Thus, although there is a drop in resolution, it is not as large as would be the case for traditional binning. Further, using one pixel signal in two pixels clusters allows for effective feature detection.

This is schematically illustrated in the bottom part of FIG. 17. There, a corner P moving through the scene with velocity v is shown. Light from the corner P will at the same time fall on pixels of horizontal cluster type 20*a* and vertical cluster type 20*b*. The combined signal of the pixels 51 of these clusters will be fed to respective processing units 20. There it will be three-times as visible as a comparable signal obtained without clustering the pixels. Moreover, the output will be significantly larger than the output produced for diagonal clusters 20*c*. Thus, by obtaining output signals for horizontal and vertical cluster types at the same time, presence of corner P in the 3×3 pixel block is an intrinsic output.

Here, it should be noted that this result is not achievable with traditional binning, since for traditional binning the signal of the pixel at the intersection of the horizontal cluster 20*a* and the vertical cluster 20*b* would be assigned either to the one or to the other cluster, but not to both. Thus, in traditional binning, intrinsic detection of more complicated features, as e.g. corner P is not possible.

This type of "anisotropic binning" is beneficial for several applications. For example, in event based de-blurring the event data stream is used to correct for the motion blur in an image. Often, the data are too noisy if no binning is applied, while if traditional binning is applied the spatial resolution is too low for de-blurring. However, using the above technique allows getting a better signal to noise ratio thanks to the binning, while compressing the data to meaningful patterns, e.g. edges and corners, mitigates the loss in resolution.

Further, based on event data it is possible to increase the temporal resolution of intensity frames, thus generating super slow motion videos with a high number of frames per second. Similar to de-blurring, this application can benefit from event data that also carries information about an underlying geometric pattern.

A further example is the measurement of optical flow, where it is usually needed to gain knowledge about the geometric texture in a scene. Anisotropic Binning directly delivers information about the geometric pattern, thus comparing the responses of a pattern over time might allow gaining information about the optical flow observed by the pattern.

Just as well a cluster could be tuned to respond to a certain pattern such as a QR-code. This could make QR-code detection, and tracking, much more efficient compared to traditional approaches.

It has to be noted that the circuitry 30 may be configured to dynamically change connections between the plurality of pixels 51 and the plurality of processing units 20, i.e. to change the assignment of electrical signals from the pixels 51 to the processing units 20 from time to time.

For example, switches may be used to decide on the connection of the pixels 51 with the processing units 20. Just the same, registers and control signals may be used, ideally during operation, to implement different connection patterns while the sensor is running. In this manner, the number of features that is detectable by the sensor device 10 can be increased. Moreover, the sensor device 10 may be adapted to its current use, i.e. to a mode of highest resolution or a mode of most efficient feature extraction.

Figure 18:
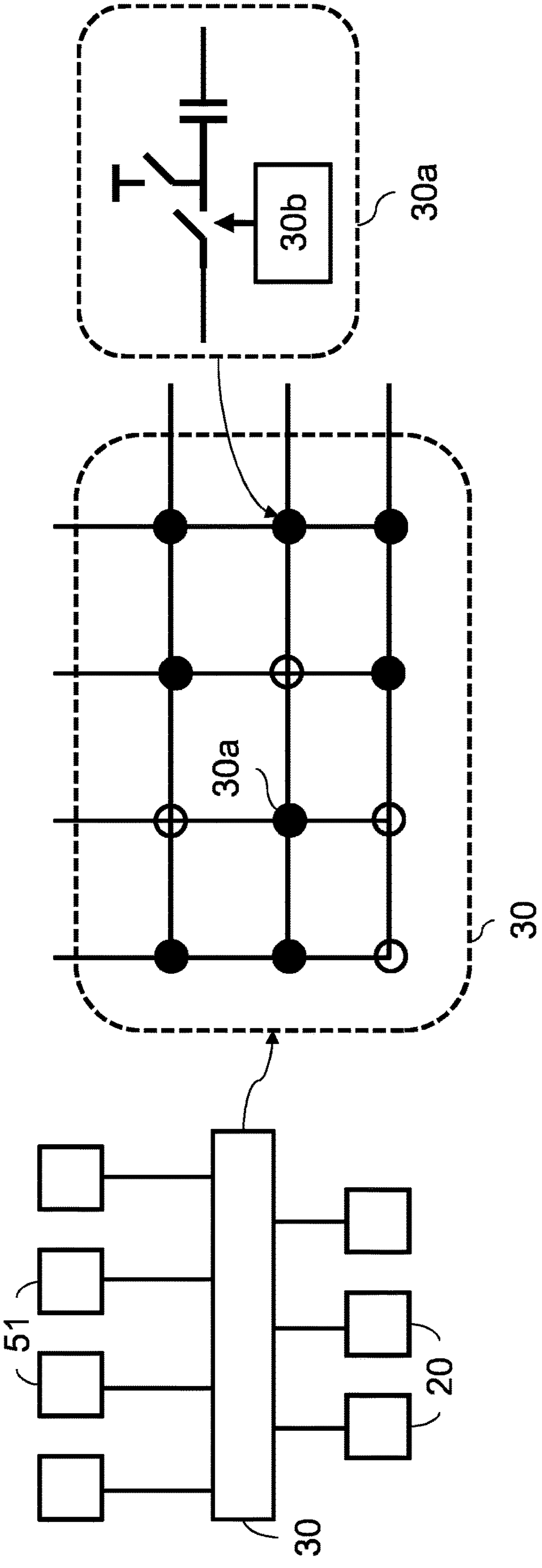
FIG. 18 is a schematic block diagram showing exemplary connections between pixels and processing units that can be changed dynamically.

FIG. 18 shows an according structure in a simplified manner. Here circuitry 30 that connects pixels 51 and processing units 20 is not fixed, but may enable and disable some connecting nodes. In the middle part of FIG. 18 this is symbolized by using black circles to show a closed connection, while an open circle shows an open connection.

A schematic example of a corresponding switch 30*a* coupled to a memory 30*b* is shown at the right hand side of FIG. 18. Here, the memory 30*b* may be programmable, fused, or hardwired in order to control the switch 30*a*. Of course, any other implementation will be feasible that allows changing the connection between pixels 51 and processing units 20.

In particular, in the above example, the dynamic change may be based on an artificial intelligence, AI, model. Further, the AI model may also modify the strength of the electrical signal of the single pixels 51 as it is fed to the processing units 20, i.e. apply weights to these signals. Switching off a connection can in this context be understood as setting a weight to zero.

By using an AI model the sensor device 10 may be enabled to adapt autonomously to certain situations. For example, the sensor device 10 may recognize a reduced illumination and switch from a "one pixel 51 to one processing unit 20" connection to an appropriate one of the above described connections. Further, the sensor device 10 may recognize that de-blurring or other functionalities need to be applied to improve the quality of a captured image and adjust the circuitry 30 such as to apply e.g. anisotropic binning as described above with respect to FIG. 17. Here, also the patterns of interest to which the pixel cluster are grouped can be set by using the artificial intelligence model. In general, any cost function that is available for a specific task of the sensor device 10 can be used to train the sensor device 10.

Figure 19A:
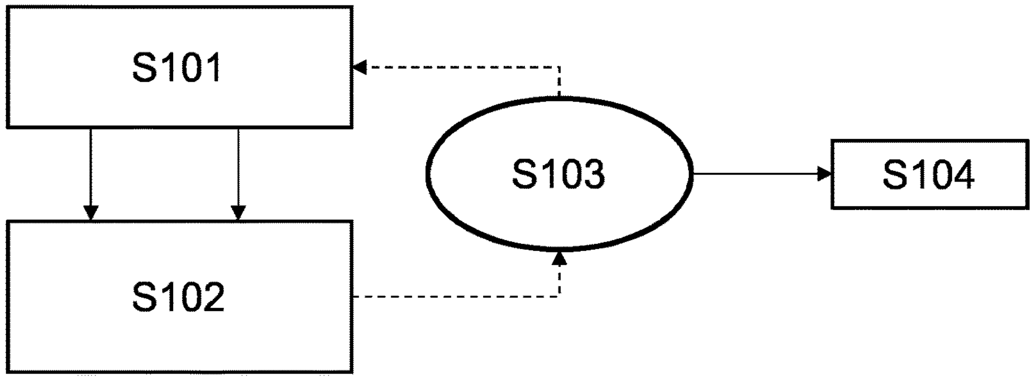
FIGS. 19A and 19B are schematic process flows of artificial intelligence models.
Figure 19B:
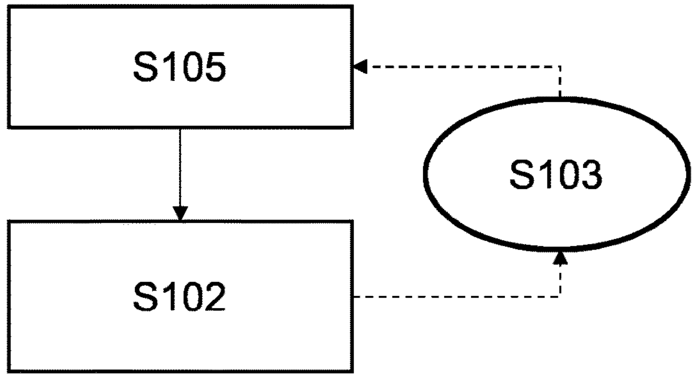

FIGS. 19A and 19B show schematic diagrams for two possible implementations of such an AI model that use a neural network. While FIG. 19A refers to a simulation based pre-trained model, i.e. an AI model executed previous and/or in parallel on an external device, FIG. 19B refers to an AI model executed by the sensor device 10 during operation.

In FIG. 19A, at S101 operation of the sensor device 10 to be controlled is simulated. The simulated output of the sensor device 10 is provided together with a ground truth check of the real sensor device 10 to calculate a cost function at S102. The output of the cost function is provided to the AI model, which sets at S103 the optimal connections (or weights) between pixels 51 and processing units 20 and provides this information to the sensor device at S104.

This external AI model may be run to remotely control the sensor device 10 or to guide the chip design of the sensor device 10, by optimizing a pre-determined connection pattern or weighting pattern between pixels 51 and processing units 20

In the model of FIG. 19B the real sensor device is monitored at S105 and the sensor outputs are provided to the cost function calculation at S102. The output is again provided to the AI modelling at S103, which provides in this case parameters for reconfiguring the circuitry 30 of the sensor device 10. In this manner a fully autonomous adaption of the connections between pixels 51 and processing units 20 can be achieved.

In the above, connections between pixels 51 and processing units 20 have been described at a rather abstract level. The following provides more concrete examples for these connections. It has to be understood that this is merely exemplary, and that many other configurations exist for implementing the circuitry 30 that connects pixels 51 and processing units 20. In particular, it has to be understood that the one-dimensional arrangement of pixels 51 and processing units 20 is chosen only for the ease of description. It does by no means restrict the possible connections between pixels 51 and processing units 20.

Figure 20:
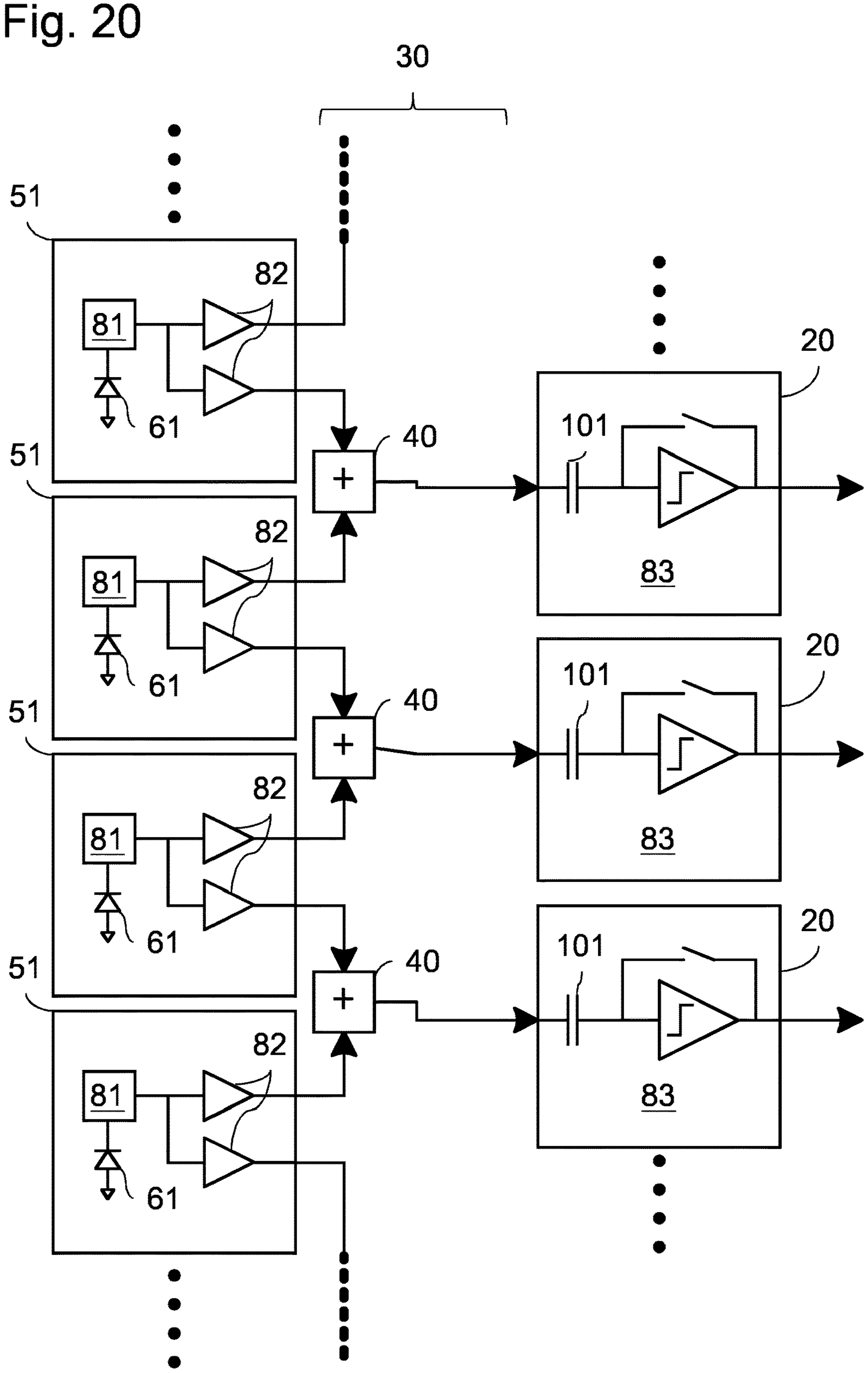
FIG. 20 is a schematic block diagram showing circuitry between pixels and processing units.

For example, as schematically illustrated in FIG. 20, the circuitry 30 may comprise one or several signal summation blocks 40 that are configured to sum the at least two electrical signals provided to one processing unit 20 and to provide the summation result to said processing unit 20.

In FIG. 20 as in the following figures circuit details are schematically provided that refer to a DVS/EVS as discussed above. It has to be noted that the split of elements of the processing chain for event detection shown in FIG. 20 and the following figures as well as the usage of a DVS/EVS is merely exemplary.

According to the example of FIG. 20 the photoelectric conversion element 61 is grouped together with the current-voltage converting section 81 and buffers 82 on one semiconductor substrate. These elements can therefore be considered a pixel 51 or a front-end of the sensor device 10, since they constitute the front elements on which light impinges and provide the first processing steps. Due to the presence of the current-voltage converting sections 81 the pixels 51 output a photovoltage as electrical signal.

On the other hand, the processing units 20 may be constituted by the subtraction section 83, a combination of the subtraction section 83 and the quantization section 84, if necessary supplemented with additional processing stages. In the event detection chain, the input of the subtraction section 83 is particularly sensitive to low illumination conditions, since its output strongly depends on the photovoltage provided to the input capacitor 101. In particular, if the photovoltage provided to the input capacitor 101 is too noisy, the difference between light intensities actually hitting the sensor device 10 at different times, which is in principle calculated in the subtraction section 83, will be lost within the noise.

Therefore, the division of the processing chain of the event detection section 52 of FIG. 5 as shown in FIG. 20 is beneficial for event detection, since the photovoltages of different pixels 51 are summed in the summation blocks 40 to increase the signal to noise ratio of the signal applied to the input capacitor 101.

Here, the processing units 20 are preferably arranged on a second semiconductor substrate that forms together with the first substrate a 3D-IC structure. The processing units 20 form therefore a back-end of the sensor device 10, i.e. a processing layer located on the back side of the sensor device and directed to later processing steps. Such a distribution of elements across different layers/substrates of a 3D-IC allows for a maximum miniaturization and therefore a maximum resolution of the sensor device 10.

Further, if necessary, the circuitry 30, consisting essentially of the summation blocks 40 may be formed on an own, in-between semiconductor substrate or may be formed either on the first substrate or the second substrate, or even in a distributed manner.

In the example of FIG. 20, every pixel 51/every front-end is equipped with multiple buffers 82, one for each processing unit 20/each back-end that is connected to the respective pixel 51. Buffers 82 of different pixels 51 provide their electrical signals to one signal summation block 40. The signal summation block collects the signals and generates an input for the back-end/the respective processing unit 20. Here, it should be noted that the signal summation block 40 may simply add up the voltages provided by different buffers 82. However, the signal summation block 40 may also form the average, a weighted sum or an output according to a more complicated function that depends on the input photovoltages.

Figure 21:
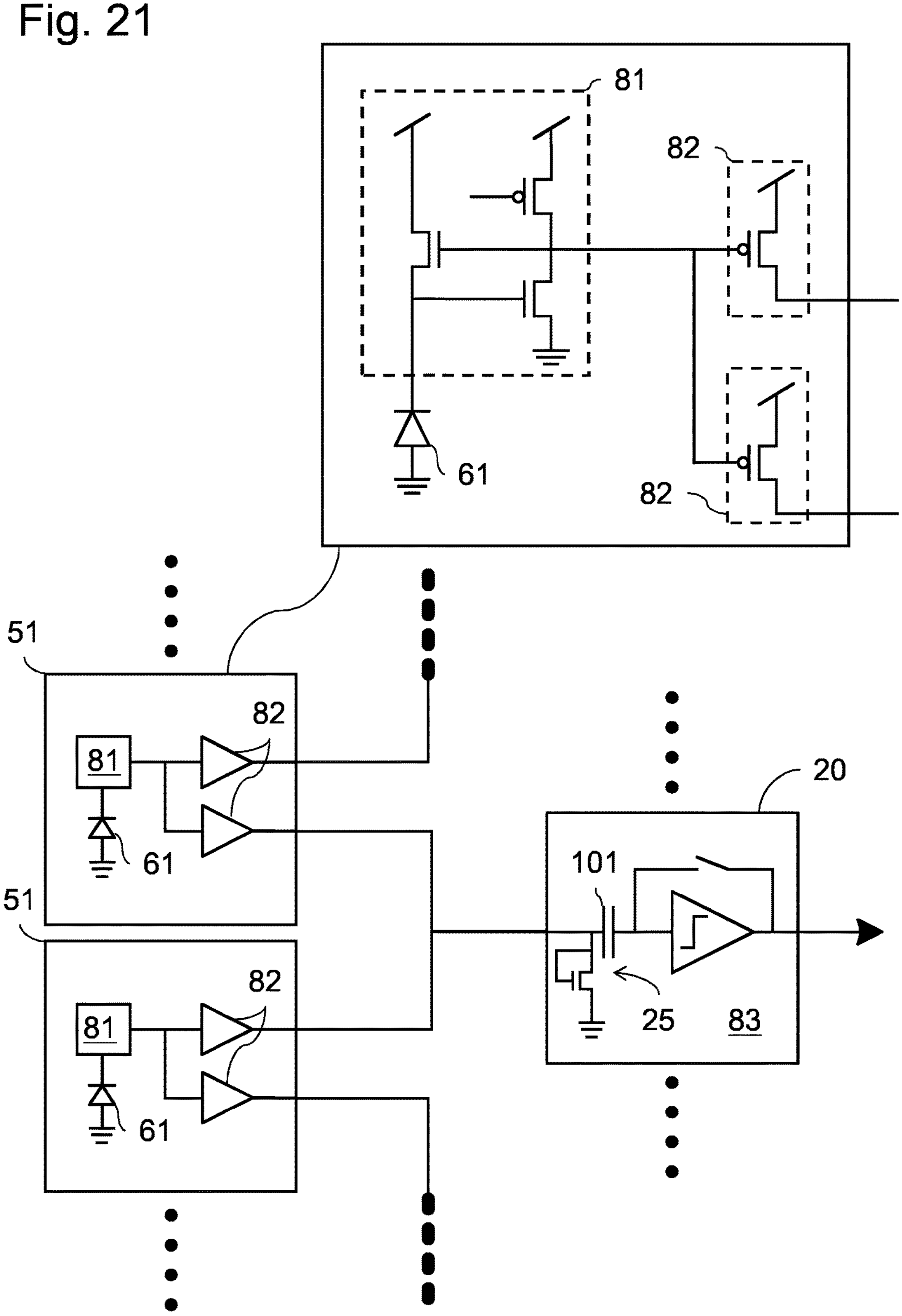
FIG. 21 is a schematic block diagram showing other circuitry between pixels and processing units.

One example for a concrete implementation of such a signal summation block 40 is illustrated with respect to FIG. 21. FIG. 21 shows more detailed circuit diagrams of the current-voltage converting section 81 and the buffers 82. In particular, the current-voltage converting section 81 may take the form discussed above with respect to FIG. 6 that leads to a logarithmic conversion of photocurrent from the photoelectric conversion element 61 to photovoltage. Of course, any other type of current-voltage conversion may be chosen. For example, also a linear conversion could be applied or a different circuitry leading to logarithmic conversion.

Here, the buffers 82 are formed by input transistors of a common-source stage, where inputs from different pixels 51 are connected in parallel to a common load stage 25 in each processing unit 20. In this manner, the voltage provided to the processing unit 20, or the input capacitor 101, respectively, will depend on the sum of the output voltages of the pixels 51 (inverted and, in general, not linearly, in this specific implementation: lower illuminations levels are favored in the signal summation).

The arrangement of FIG. 21 may for example be implemented using 3-wafer integrated circuit stacking. The wafer/substrate exposed to light may contain the photoelectric conversion element 61 and the 2 NFET devices of the current-voltage converting section 81. The middle wafer/substrate may contain the PFET bias device of the current-voltage converting section 81 and the common-source stages inputs (which could be implemented with PFET devices) of the buffers 82. The bottom wafer/substrate, that typically can make use of a higher density process, may contain the bias transistor of the common load stage 25 and the rest of the event detection section 52. If necessary, relative contributions of the pixels 51 to a single processing unit 20 can be weighted by properly sizing the buffer stages in the pixels 51 relative to each other.

Figure 22A:
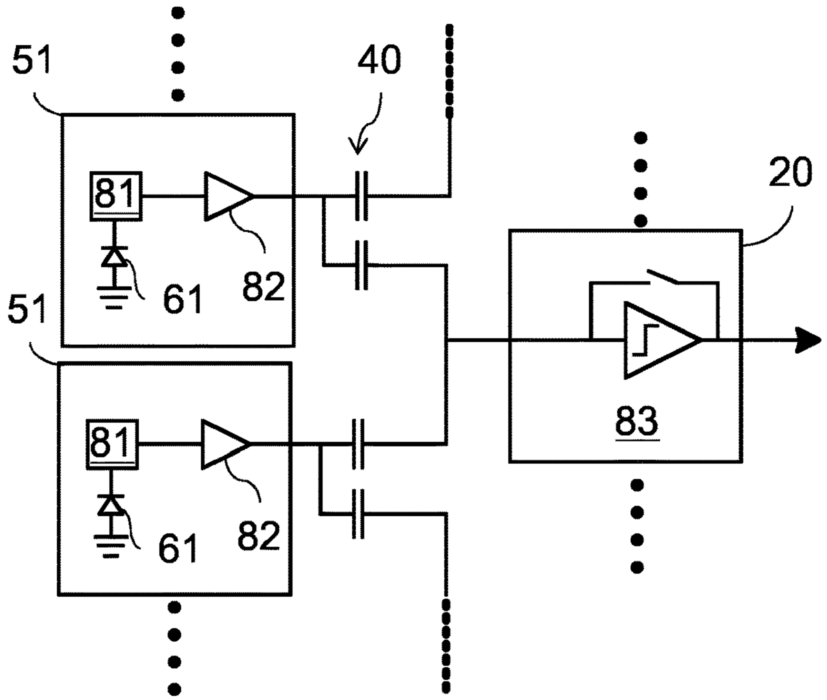
FIGS. 22A and 22B are schematic block diagrams showing other circuitry between pixels and processing units.
Figure 22B:
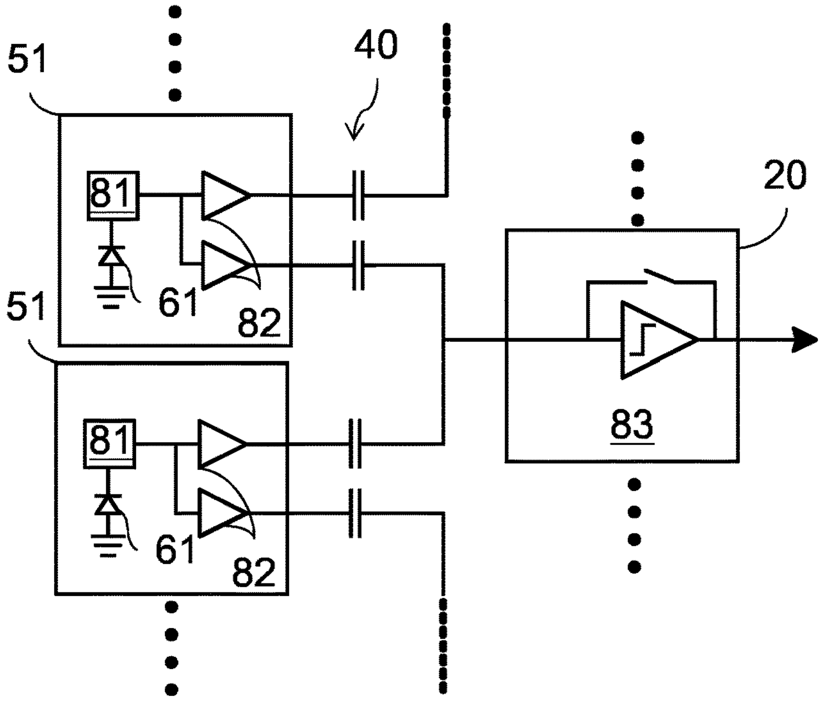

Another implementation of the summation block 40 is schematically illustrated in FIGS. 22A and 22B.

According to the example of FIG. 22A one buffer 82 (preferably, a source-follower stage) is used in each pixel 51. The signals of different pixels 51 are then combined by multiple capacitors. Thus instead of using a single input capacitor 101 in the subtraction section 83, this capacitor is moved, split, and one capacitor is set on each line connecting the pixels 51 with the processing units 20. Thus, each front-end/pixel 51 is connected to many capacitors, each of which connects, on the other substrate, to a different back-end/processing unit 20. The voltage input of one processing unit 20 is then the combination of the voltage output of all the pixels 51 connected to it through a capacitor. The capacitors may be either located on the pixel substrate or the processing unit substrate, or may even be formed on an own substrate.

By changing the relative size of capacitors connected to a specific processing unit 20, the relative contribution of each pixel 51 to a certain processing unit can be weighted. This might be useful for anisotropic binning, to improve the sensitivity of the sensor device 20 to specific light patterns.

The example of FIG. 22B is identical to the example of FIG. 22A except to prevent propagation of a kick-back due to reset or large signal swing at the back end/the processing units 20 through the common front-ends/pixels 51, buffers 82 are added in the pixels 51, one for each processing unit 20 to which the pixel 51 is connected.

Figure 23:
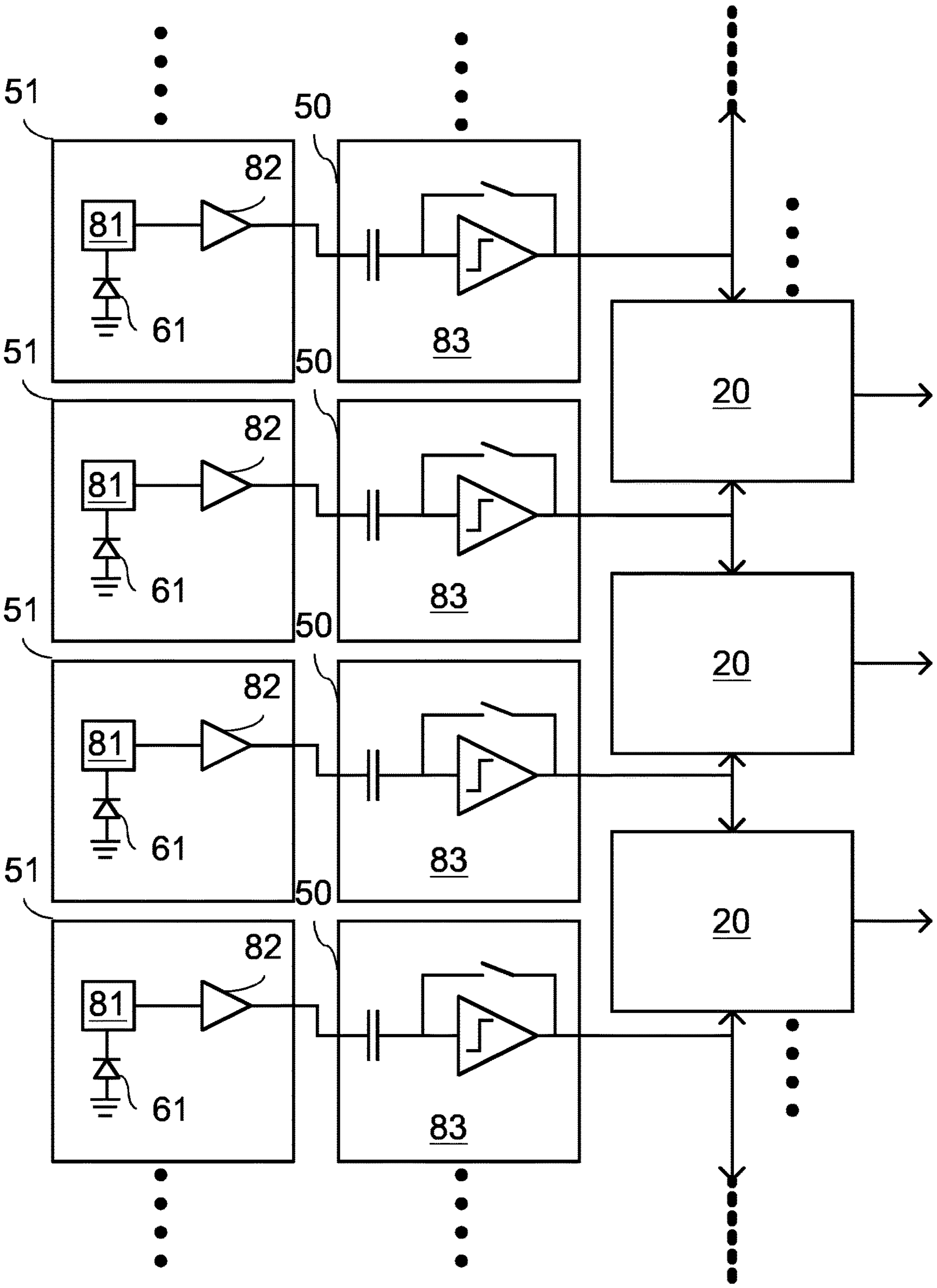
FIG. 23 is a schematic block diagram showing other circuitry between pixels and processing units.

In the above examples parts of the event detection section 52 did form the processing units 20. However, components of the event detection section 52 do not necessarily form parts of the processing units 20. As for example illustrated in FIG. 23, the sensor device 10 may comprise a plurality of event detection units 50 that are each configured to receive the electrical signal of one pixel 51, to perform event detection based on said electrical signals, and to provide the result of event detection as electrical signal to the processing units 20. Thus, the event detection units 50 may be constituted by the parts of the event detection section 52 as illustrated in FIG. 5 that are not part of the pixels 51. In FIG. 23 this is symbolized by referring to the subtraction section 83.

As can be seen from FIG. 23, in this arrangement no binning of pixels 51 and no sharing of pixel signals is carried out before event detection has been finished. Here, it is the signal output from the event detection units 50 that is both binned and distributed. Here, this signal output is considered information on the electrical signal generated by a pixel 51.

The processing units 20 are then constituted by digital circuits that are configured to decide on outputting an event notification based on the results of event detection provided to it.

In this implementation, event detection will be carried out with low signal to noise ratio, but with high spatial resolution. Thus, for each output of an event detection unit 50 it is in principle uncertain whether a detected event is due to a real intensity change or due to noise. However, the high spatial resolution of the event detection allows the assumption that real events will almost never be detected by a single pixel 51/event detection unit 50, but will be part of a spatially distributed event cluster. Thus, binning the digital outputs of the event detection units 50 will allow digital algorithms for deciding whether a detected event was real or caused by noise.

Thus, also by digital filtering one can increase the accuracy of event detection at low illumination conditions. In this manner also the outputs of DVS/EVS devices that are not formed as discussed above can be digitally trimmed to low light conditions.

Above it has been described with respect to FIG. 17 how anisotropic binning can be used to make a sensor device intrinsically sensitive to certain spatial patterns. In principle, the same can be done in the temporal domain by including delay units 70 in the circuitry 30 that delay information on the electrical signals provided to the processing units 20 by a predetermined time. Further, when adding such delay units 70 (or memory cells that serve to store pixel outputs to retransmit them at a later time) to the connections between pixels 51 and processing units 20, the sensor device 10 could be made sensitive to temporal sequences and thus responsive to certain motions (e.g. moving left or right) or combination of motion and spatial pattern (e.g. a horizontal line moving down). By using an AI model and/or switchable delay units 70 this sensitivity can be (autonomously) adapted to specific situations. In addition, the impact of each signal could also be weighted to improve the functioning of the system.

Figure 24:
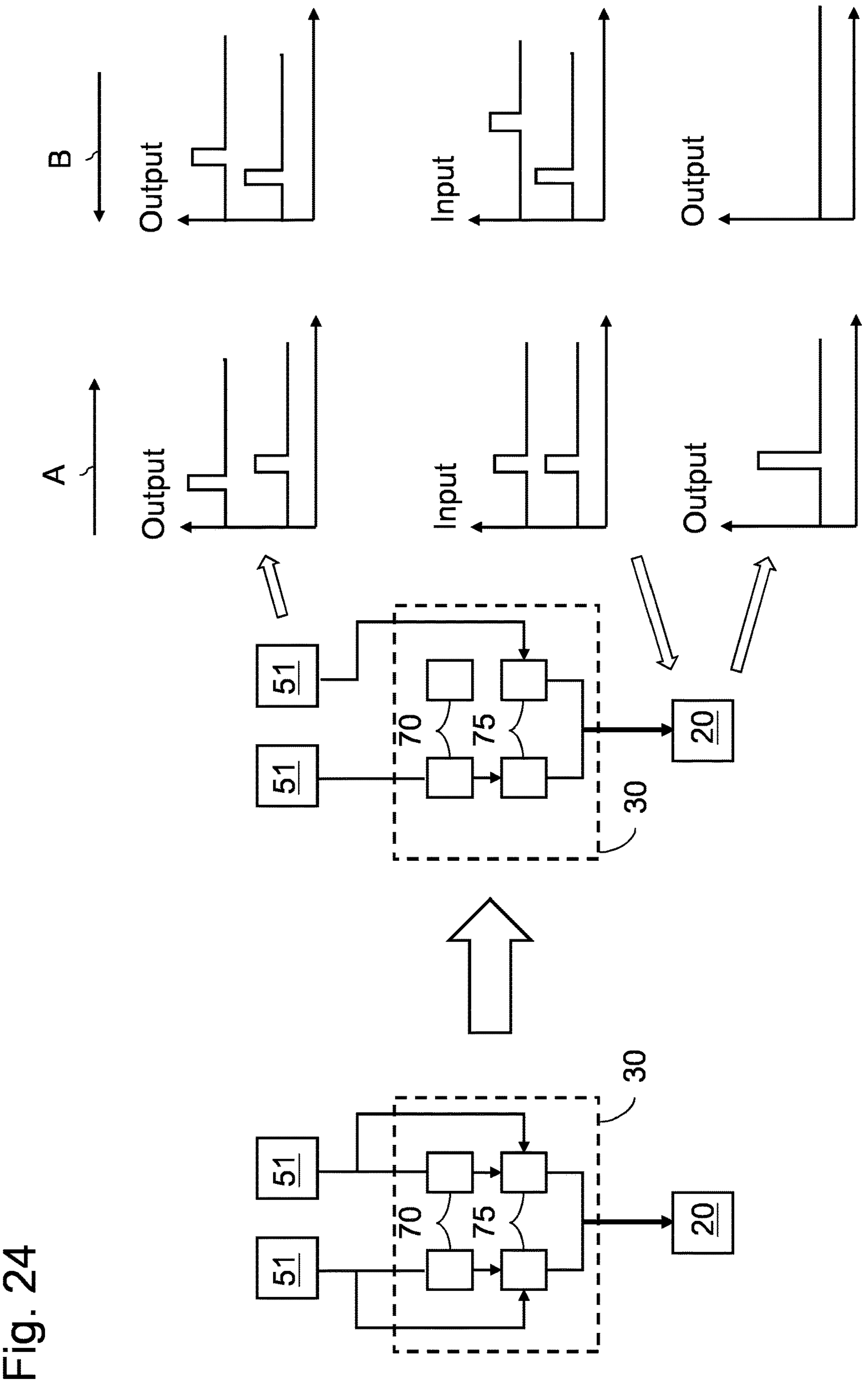
FIG. 24 is a schematic block diagram showing other circuitry between pixels and processing units.

FIG. 24 schematically illustrates the working principle of such delay units 70. As shown on the left hand side of FIG. 24 delay units 70 and weight units 75 may be included in the circuitry 30 connecting each pixel 51 with the respective processing unit 20. The electrical signal of the pixel 51 (or information on it) may be either provided to the processing unit 20 with or without passing the delay unit 70. Which delay unit 70 is bypassed decides on which temporal correlation is intrinsically recognized.

In the middle part of FIG. 24 the signal path for an improved recognition of movements to the right is illustrated. Here, signals from the left pixel 51 are delayed, but not signals of the right pixel 51.

The right hand side of FIG. 24 shows the signal situation for movements to the right (arrow A) and movements to the left (arrow B) for this implementation of the circuitry 30. For movements to the right the left pixel 51 will produce a signal earlier than the right pixel 51 (and vice versa for movements to the left). Due to the delay unit 70 passed only by the signal of the left pixel 51, for movements to the right the signals of both pixels 51 will be input at the same time to the processing unit, while they will be shifted further apart for movements to the left. Accordingly, only for movements to the right the processing unit 20 will produce a positive output, while no output is generated for movements to the left.

Thus, by setting non-zero delays to certain connections between pixels 51 and processing units 20 motion sensitivity can be increased. Further, by adjusting the amount of delay, the sensor device 10 can be set to an improved recognition of movements of a certain speed. Of course, such sensitivity improvements will be most beneficial when combined with a dynamic adaption of the delay switching and the delay time adjustment.

Figure 25:
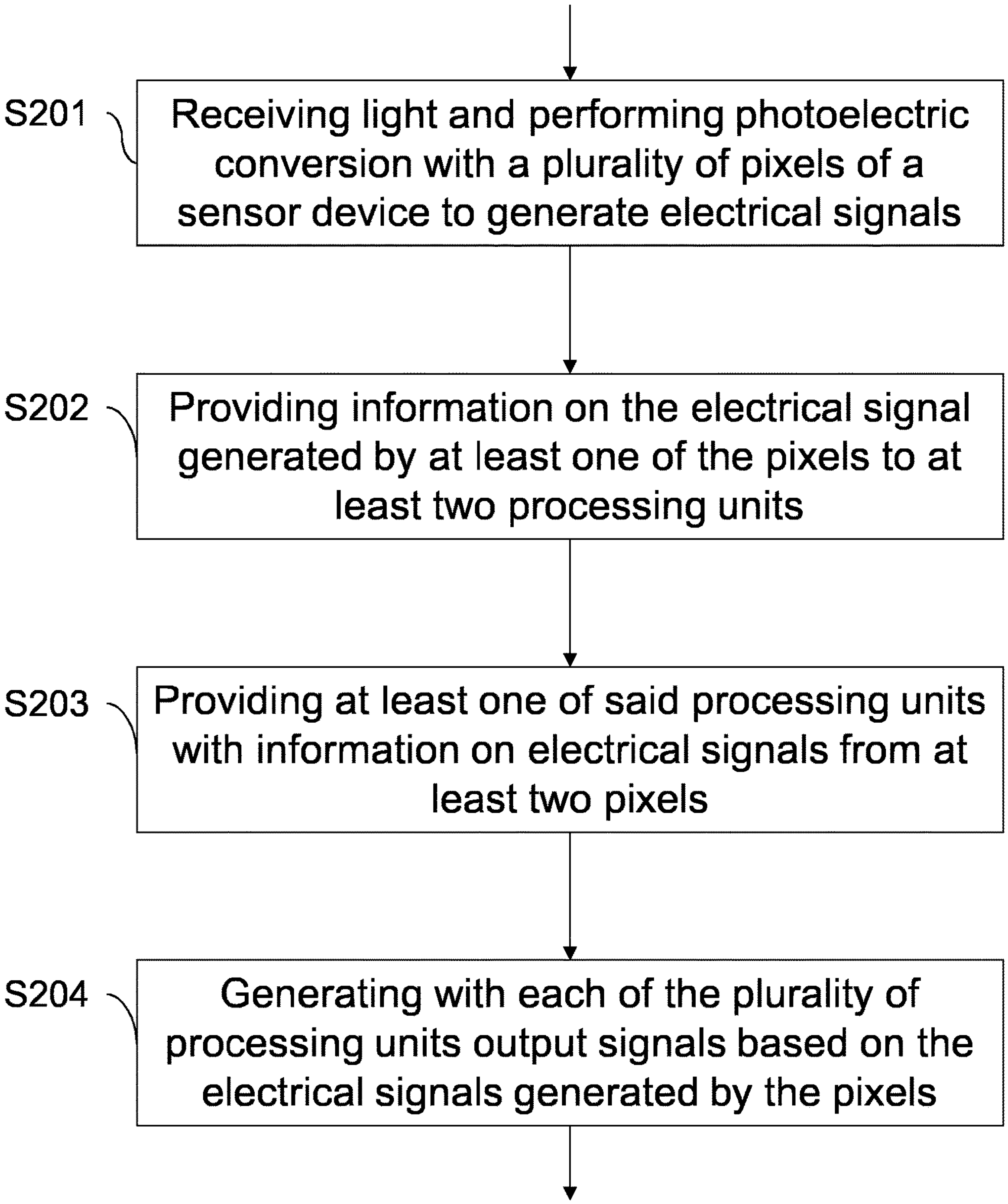
FIG. 25 illustrates schematically a process flow of a method for operating a sensor device

Above, various implementations of the basic idea to bin different pixel signals as well as to share a single pixel signal with various processing units 20 have been discussed. The basic method underlying all these implementations is again summarized below with respect to FIG. 25.

Here, at S201 light is received and photoelectric conversion is performed with a plurality of pixels 51 of a sensor device 10 as described above, in order to generate electrical signals.

At S202 via the circuitry 30 of the sensor device 20 that connects the plurality of pixels 51 with a plurality of processing units 20 information on the electrical signal generated by at least one of the pixels is provided to at least two processing units 20.

At S203 via the circuitry 30 at least one of said processing units 20 is provided with information on electrical signals from at least two pixels 51.

At S204 with each of the plurality of processing units 20 output signals are generated based on the electrical signals generated by the pixels 51.

Thus, the basic idea is to reduce on the one hand the spatial resolution of the system by binning information on electrical signals generated by the pixels 51 in order to increase the signal to noise ratio. On the other hand, this decrease in resolution is compensated by the fact that information on electrical signals of certain (or all) pixels 51 is shared between different processing units 20. In this manner, it is possible to obtain highly resolved image information also in low illumination conditions.

The technology according to the above (i.e. the present technology) is applicable to various products. For example, the technology according to the present disclosure may be realized as a device that is installed on any kind of moving bodies, for example, vehicles, electric vehicles, hybrid electric vehicles, motorcycles, bicycles, personal mobilities, airplanes, drones, ships, and robots.

Figure 26:
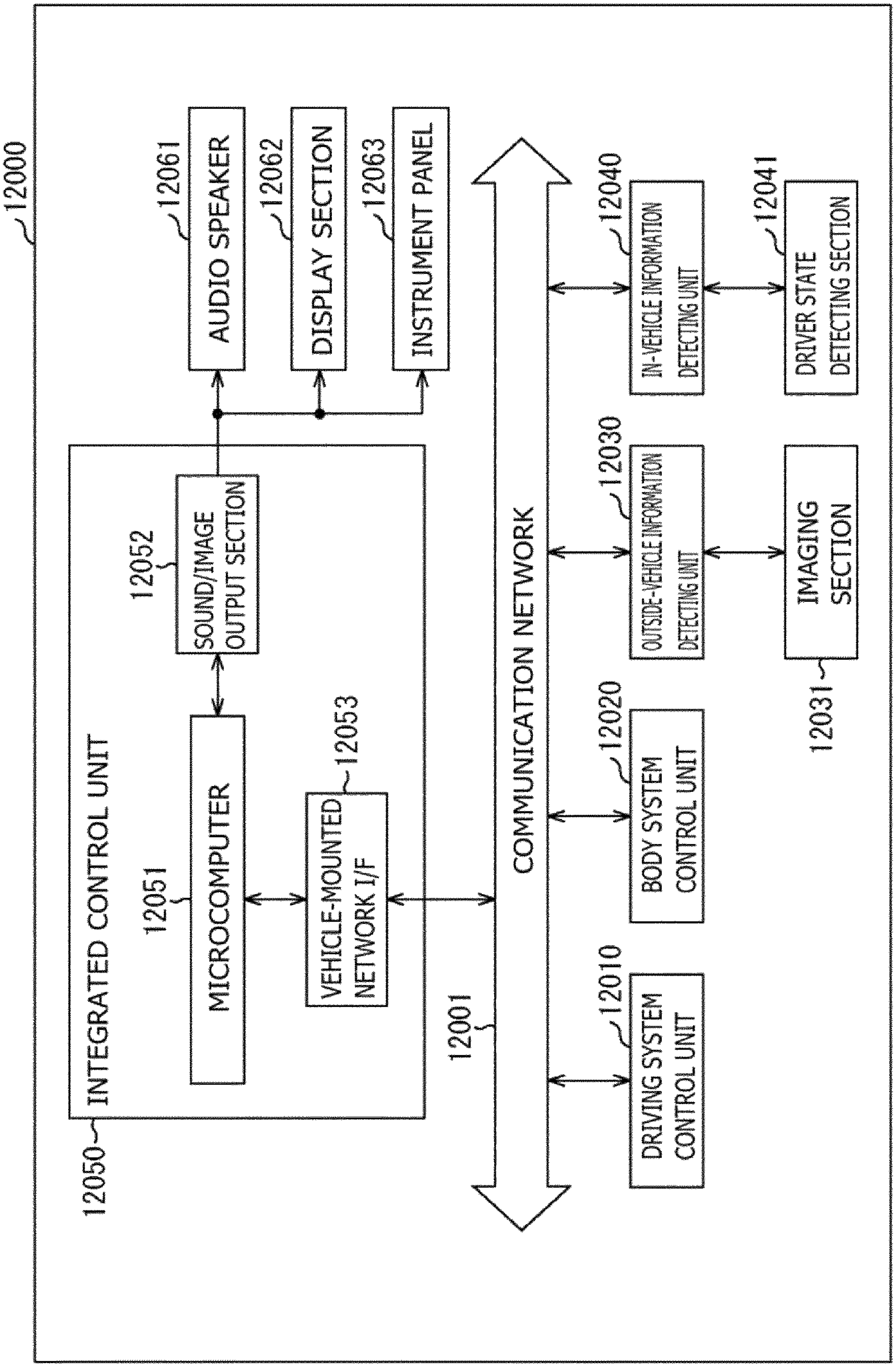
FIG. 26 is a schematic block diagram of a vehicle control system.

FIG. 26 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 26, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer

12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 26, an audio speaker 12061, a display section 12062, and an instrument panel 12063 are illustrated as the output device. The display section 12062 may, for example, include at least one of an on-board display and a head-up display.

Figure 27:
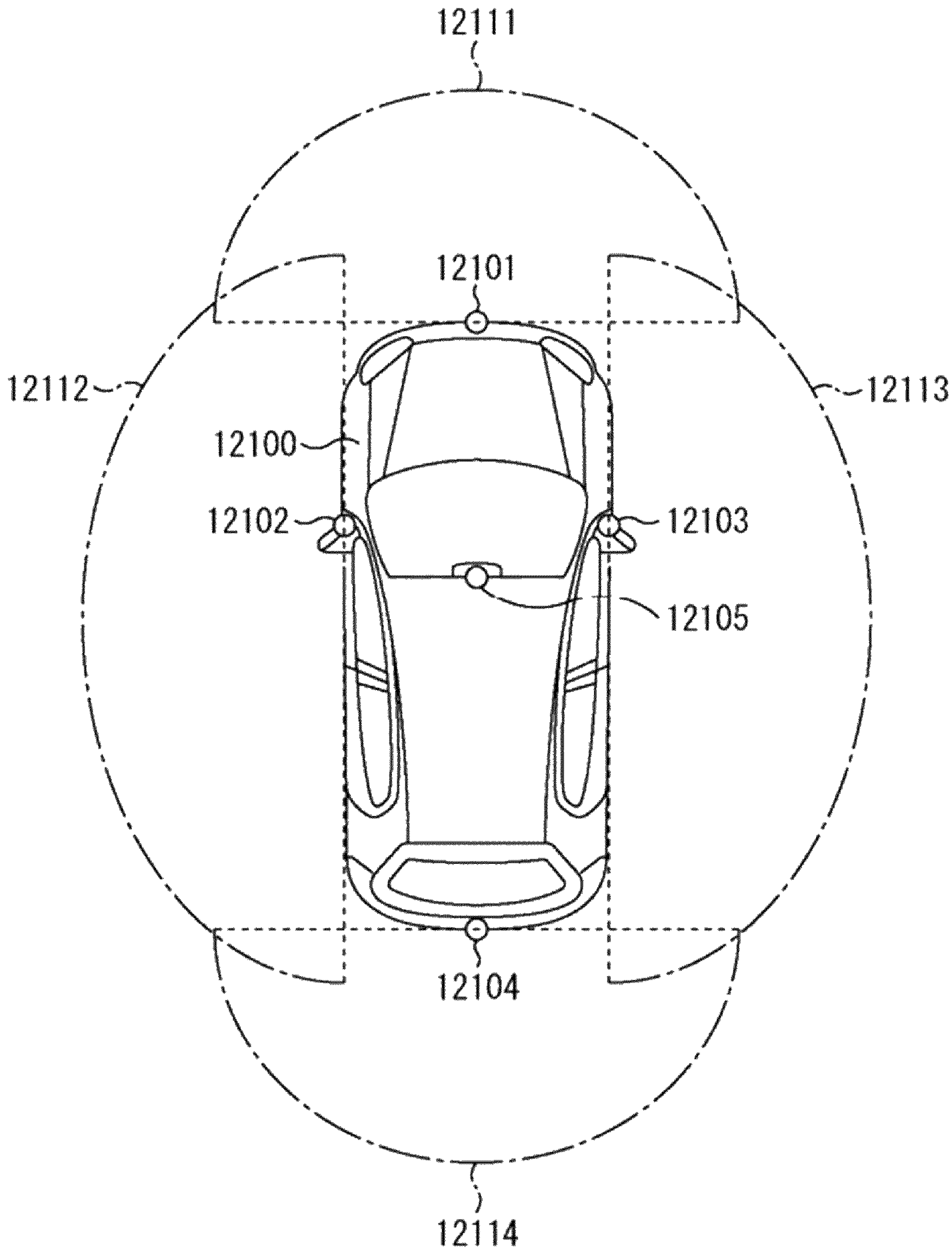
FIG. 27 is a diagram of assistance in explaining an example of installation positions of an outside-vehicle information detecting section and an imaging section.

FIG. 27 is a diagram depicting an example of the installation position of the imaging section 12031.

In FIG. 27, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 27 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure is applicable has been described above. The technology according to the present disclosure is applicable to the imaging section 12031 among the above-mentioned configurations. Specifically, the sensor device 10 is applicable to the imaging section 12031. The imaging section 12031 to which the technology according to the present disclosure has been applied flexibly acquires event data and performs data processing on the event data, thereby being capable of providing appropriate driving assistance.

Note that, the embodiments of the present technology are not limited to the above-mentioned embodiment, and various modifications can be made without departing from the gist of the present technology.

Further, the effects described herein are only exemplary and not limited, and other effects may be provided.

Note that, the present technology can also take the following configurations.

1. A sensor device comprising:
 a plurality of pixels each configured to receive light and perform photoelectric conversion to generate an electrical signal;
 a plurality of processing units each configured to generate output signals based on the electrical signals generated by the pixels; and
 circuitry that connects the plurality of pixels and the plurality of processing units such that information on the electrical signal generated by at least one of the pixels is provided to at least two processing units, and such that at least one of said processing units is provided with information on electrical signals from at least two pixels.
2. The sensor device according to 1, wherein
 the pixels are configured to output a photovoltage as an electrical signal; and
 the processing units are configured to perform event detection based on the photovoltages generated by the pixels.
3. The sensor device according to 1, further comprising
 a plurality of event detection units each configured to receive the electrical signal of one pixel, to perform event detection based on said electrical signals, and to provide the result of event detection as electrical signal to the processing units; wherein
 said at least one processing unit is a digital circuit that is configured to decide on outputting an event notification based on the results of event detection provided to it.
4. The sensor device according to any one of 1 to 3, wherein
 the circuitry connects the plurality of pixels and the plurality of processing units such that at least a part of the pixels each provides information on their electrical signals to N processing units, and each of at least a part of the processing units is provided with information on electrical signals from N pixels, where N is a natural number.
5. The sensor device according to 4, wherein
 the N pixels are arranged in a regular pattern, or
 the N pixels are freely distributed among the plurality of pixels.

6. The sensor device according to any one of 1 to 5, wherein
the circuitry connects the plurality of pixels and the plurality of processing units such that the processing units are provided with information on electrical signals from pixels that are arranged in predetermined patterns.
7. The sensor device according to any one of 1 to 6, wherein
the circuitry is configured to dynamically change connections between the plurality of pixels and the plurality of processing units.
8. The sensor device according to 7, wherein
the dynamic change is based on an artificial intelligence model.
9. The sensor device according to any one of 1 to 8, wherein
the circuitry comprises a signal summation block that sums the at least two electrical signals provided to the one processing unit and provides the summation result to said processing unit.
10. The sensor device according to 9, wherein
in the signal summation block electrical signals are weighted.
11. The sensor device according to any one of 1 to 10, wherein
the circuitry comprises a delay unit that delays information on one of said at least two electrical signals to said at least one processing unit by a predetermined time.
12. The sensor device according to any one of 1 to 11, wherein
the sensor device is a semiconductor device comprising at least two semiconductor substrates;
the plurality of pixels is formed on a first semiconductor substrate; and
the plurality of processing units is formed on a second semiconductor substrate that differs from the first semiconductor substrate.
13. A method for operating a sensor device, the method comprising:
receiving light and performing photoelectric conversion with a plurality of pixels of the sensor device to generate electrical signals,
providing via circuitry of the sensor device that connects the plurality of pixels with a plurality of processing units information on the electrical signal generated by at least one of the pixels to at least two processing units,
providing via the circuitry at least one of said processing units with information on electrical signals from at least two pixels; and
generating with each of the plurality of processing units output signals based on the electrical signals generated by the pixels.

The invention claimed is:

1. A sensor device comprising:
a plurality of pixels each configured to receive light and perform photoelectric conversion to generate an electrical signal;
a plurality of processing units each configured to generate output signals based on the electrical signals generated by the pixels; and
circuitry that connects the plurality of pixels and the plurality of processing units such that
same information on the electrical signal generated by at least one of the pixels is provided to at least two processing units, and
at least one of said processing units is provided with information on electrical signals from at least two pixels.

2. The sensor device according to claim 1, wherein
the pixels are configured to output a photovoltage as an electrical signal; and
the processing units are configured to perform event detection based on the photovoltages generated by the pixels.

3. The sensor device according to claim 1, wherein
the circuitry connects the plurality of pixels and the plurality of processing units such that at least a part of the pixels each provides information on their electrical signals to N processing units, and each of at least a part of the processing units is provided with information on electrical signals from N pixels, where N is a natural number.

4. The sensor device according to claim 3, wherein
the N pixels are arranged in a regular pattern, or
the N pixels are freely distributed among the plurality of pixels.

5. The sensor device according to claim 1, wherein
the circuitry connects the plurality of pixels and the plurality of processing units such that the processing units are provided with information on electrical signals from pixels that are arranged in predetermined patterns.

6. The sensor device according to claim 1, wherein
the circuitry is configured to dynamically change connections between the plurality of pixels and the plurality of processing units.

7. The sensor device according to claim 6, wherein
the dynamic change is based on an artificial intelligence model.

8. The sensor device according to claim 1, wherein
the circuitry comprises a signal summation block that is configured to sum the at least two electrical signals provided to the at least one processing unit and to provide the summation result to said at least one processing unit.

9. The sensor device according to claim 8, wherein
in the signal summation block, electrical signals are weighted.

10. The sensor device according to claim 1, further comprising
a plurality of event detection units each configured to receive the electrical signal of one pixel, to perform event detection based on said electrical signals, and to provide the result of event detection as electrical signal to the processing units; wherein
said at least one processing unit is a digital circuit that is configured to decide on outputting an event notification based on the results of event detection provided to it.

11. The sensor device according to claim 1, wherein
the circuitry comprises a delay unit that delays information on one of said at least two electrical signals to said at least one processing unit by a predetermined time.

12. The sensor device according to claim 1, wherein
the sensor device is a semiconductor device comprising at least two semiconductor substrates;
the plurality of pixels is formed on a first semiconductor substrate; and the plurality of processing units is formed on a second semiconductor substrate that differs from the first semiconductor substrate.

13. A method for operating a sensor device, the method comprising:

receiving light and performing photoelectric conversion with a plurality of pixels of the sensor device to generate electrical signals, providing, via circuitry of the sensor device that connects the plurality of pixels with a plurality of processing units, same information on the electrical signal generated by at least one of the pixels to at least two processing units, providing, via the circuitry, at least one of said processing units with information on electrical signals from at least two pixels; and generating with each of the plurality of processing units output signals based on the electrical signals generated by the pixels.

14. The sensor device according to claim 1, wherein the circuitry connects the plurality of pixels and the plurality of processing units such that the at least one of said processing units is provided with the information on the electrical signals from the at least two pixels via parallel electrical paths.

15. The method according to claim 13, further comprising providing, via the circuitry and parallel electrical paths, the at least one of said processing units with the information on the electrical signals from the at least two pixels.

* * * * *